(12) United States Patent
Pinarbasi

(10) Patent No.: US 6,404,606 B1
(45) Date of Patent: Jun. 11, 2002

(54) SEED LAYER STRUCTURE FOR A PLATINUM MANGANESE PINNING LAYER IN A SPIN VALVE SENSOR

(75) Inventor: Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/434,779

(22) Filed: Nov. 5, 1999

(51) Int. Cl.⁷ .................................................. G11B 5/39
(52) U.S. Cl. .................................................. 360/324.11
(58) Field of Search .............................. 360/324, 324.1, 360/324.11, 324.12; 324/252; 338/32 R

(56) References Cited

U.S. PATENT DOCUMENTS 6,046,892 A * 4/2000 Aoshima et al. ....... 360/324.11
6,175,477 B1 * 1/2001 Lin et al. ............... 360/324.12
6,201,671 B1 * 3/2001 Pinarbasi ............... 360/324.11
6,208,492 B1 * 3/2001 Pinarbasi ............... 360/324.11
6,219,210 B1 * 4/2001 Pinarbasi ............... 360/324.11

* cited by examiner

Primary Examiner—David L. Ometz
(74) Attorney, Agent, or Firm—Ervin F. Johnston

(57) ABSTRACT

A seed layer structure, which is provided for a platinum manganese (PtMn) pinning layer in a spin valve sensor, includes first, second and third seed layers wherein the first seed layer is aluminum oxide ($Al_2O_3$), the second seed layer is nickel manganese oxide (NiMnO) the third seed layer is tantalum (Ta). The seed layer structure increases the pinning and exchange coupling fields between the pinning layer and a pinned layer, improves recovery of the magnetic moment of the pinned layer to its original orientation after being subjected to an applied field in the presence of heat and improves predictability of performance of magnetic reads constructed on different wafers.

30 Claims, 18 Drawing Sheets

(ABS)

SEED LAYER STRUCTURE FOR A PLATINUM MANGANESE PINNING LAYER IN A SPIN VALVE SENSOR

BACKGROUND OF THE INVENTION

1. Field of the Invention

The present invention relates to a seed layer structure for a platinum manganese pinning layer of a spin valve sensor and more particularly to a seed layer structure that promotes a higher exchange coupling field $H_{ex}$ and a higher pinning field $H_p$ between the pinning layer and a pinned layer of the spin valve sensor.

2. Description of the Related Art

A spin valve sensor is employed by a read head for sensing magnetic signal fields from a moving magnetic medium, such as a rotating magnetic disk. The sensor includes a nonmagnetic electrically conductive first spacer layer sandwiched between a ferromagnetic pinned layer and a ferromagnetic free layer. An antiferromagnetic pinning layer interfaces the pinned layer for pinning a magnetic moment of the pinned layer 90° to an air bearing surface (ABS) which is an exposed surface of the sensor that faces-the magnetic disk. First and second leads are connected to the spin valve sensor for conducting a sense current therethrough. A magnetic moment of the free layer is free to rotate upwardly and downwardly with respect to the ABS from a quiescent or bias point position in response to positive and negative magnetic field signals from a rotating magnetic disk. The quiescent position, which is typically parallel to the ABS, is the position of the magnetic moment of the free layer with the sense current conducted through the sensor in the absence of signal fields.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons are scattered at the interfaces of the spacer layer with the pinned and free layers. When the magnetic moments of the pinned and free layers are parallel with respect to one another scattering is minimal and when their magnetic moments are antiparallel scattering is maximized. Changes in scattering changes the resistance of the spin valve sensor as a function of cos θ, where θ is the angle between the magnetic moments of the pinned and free layers. The sensitivity of the sensor is quantified as magnetoresistive coefficient dr/R where dr is the change in the resistance of the sensor as the magnetic moment of the free layer rotates from a position parallel with respect to the magnetic moment of the pinned layer to an antiparallel position with respect thereto and R is the resistance of the sensor when the magnetic moments are parallel.

A read head in a magnetic disk drive of a computer includes the spin valve sensor, nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is first formed followed by formation of the first read gap layer, the spin valve sensor, the second read gap layer and the second shield layer. Spin valve sensors are classified as a top or a bottom spin valve sensor depending upon whether the pinning layer is located at the bottom of the sensor next to the first read gap layer or at the top of the sensor closer to the second read gap layer. Spin valve sensors are further classified as simple pinned or antiparallel pinned depending upon whether the pinned layer structure is one or more ferromagnetic layers with a unidirectional magnetic moment or a pair of ferromagnetic layers that are separated by a coupling layer with antiparallel magnetic moments.

Because of the interfacing of the pinning and pinned layers the pinned layer is exchange coupled to the pinning layer. A unidirectional orientation of the magnetic spins of the pinning layer pins the magnetic moment of the pinned layer in the same direction. The orientation of the magnetic spins of the pinning layer are set by applying heat at or above a blocking temperature of the material of the pinning layer in the presence of a field that is directed perpendicular to the ABS. The blocking temperature is the temperature at which all of the magnetic spins of the pinning layer are free to rotate in response to an applied field. During the setting, the magnetic moment of the pinned layer is oriented parallel to the applied field and the magnetic spins of the pinning layer follow this orientation. When the heat is reduced below the blocking temperature the magnetic spins of the pinning layer pin the orientation of the magnetic moment of the pinned layer. The pinning function is effective as long as the temperature remains substantially below the blocking temperature.

Nickel oxide (NiO) is a desirable material for the aforementioned pinning layer structure in a bottom spin valve. Unfortunately, nickel oxide (NiO) has a relatively low blocking temperature which is about 220° C. In a magnetic disk drive the operating temperature may exceed 150° C. A portion of the magnetic spins of the nickel oxide (NiO) pinning layer rotate below the blocking temperature because of a blocking temperature distribution below the blocking temperature where portions of the magnetic spins of the pinning layer commence to rotate. Accordingly, a portion of the magnetic spins of the nickel oxide (NiO) pinning layer can rotate at operating temperatures in the presence of a magnetic field, such as a signal field from the rotating magnetic disk, the write field from the write head or an unwanted electric static discharge (ESD) caused by contact with a statically charged object. The problem is exacerbated when the slider contacts an asperity on the magnetic disk which can raise the temperature above the disk drive operating temperature.

In the presence of some magnetic fields the magnetic moment of the pinned layer can be rotated antiparallel to the pinned direction. The question then is whether the magnetic moment of the pinned layer will return to the pinned direction when the magnetic field is relaxed. This depends upon the strength of the exchange coupling field and the coercivity of the pinned layer. If the coercivity of the pinned layer exceeds the exchange coupling field, the exchange coupling field will not be strong enough to bring the magnetic moment of the pinned layer back to the original pinned direction. Until the magnetic spins of the pinning layer are reset the read head is rendered inoperative. Accordingly, there is a strong felt need to increase the exchange coupling field between the pinning layer and the pinned layer so that the sensor has improved thermal stability.

Another parameter that indicates the performance of the pinning of the pinned layer is the pinning field $H_p$ between the pinning and pinned layers. The pinning field, which is somewhat dependent upon the exchange coupling field $H_{ex}$, is the applied field at which the magnetic moment of the pinned layer commences to rotate in a substantial manner. If the pinning field $H_p$ is low the performance of the pinned layer structure relative to the free layer will be degraded. The exchange coupling field $H_{ex}$ and the pinning field $H_p$ will be discussed in more detail in the detailed description.

A desirable antiferromagnetic pinning layer material is platinum manganese (PtMn) since it has a higher blocking temperature than nickel oxide (NiO) and it will perform satisfactorily with less thickness than nickel oxide (NiO). The higher blocking temperature improves thermal stability and the thinner layer improves the read gap. While nickel oxide (NiO) has a blocking temperature of about 220° C. and requires a thickness of about 425 Å, platinum manganese (PtMn) has a blocking temperature of a about 350° C. and requires a thickness of about 175 Å. Unfortunately, platinum manganese (PtMn) has demonstrated a low exchange coupling field $H_{ex}$ and a low pinning field $H_p$ in bottom spin valves. If these parameters could be increased, platinum manganese (PtMn) would be a very desirable material for pinning layers in spin valve sensors.

SUMMARY OF THE INVENTION

The present invention provides a novel seed layer structure for a platinum manganese (PtMn) pinning layer that significantly increases the exchange coupling field $H_{ex}$ and the pinning field $H_p$ between the pinning layer and pinned layer structure and makes the platinum manganese (PtMn) pinning layer desirable for use in bottom spin valves. The seed layer structure comprises first, second and third seed layers wherein the first seed layer is aluminum oxide ($Al_2O_3$), the second seed layer is nickel manganese oxide (NiMnO) and the third seed layer is tantalum (Ta). The first seed layer may comprise the first read gap layer, which is typically aluminum oxide ($Al_2O_3$), or may be a separate aluminum oxide ($Al_2O_3$) layer formed on the first read gap layer. The second seed layer is located between and interfaces the first and third seed layers and the third seed layer interfaces the pinning layer structure. The seed layer structure is especially useful in AP pinned spin valves because of the noted improvement of an antiferromagnetic coupling between first and second AP pinned layers through a ruthenium AP coupling layer. Because of the improved pinning field the thickness of platinum manganese (PtMn) may be decreased from about 175 Å to about 140 Å.

Other significant advantages provided by the present seed layer structure is an improved magnetoresistive coefficient dr/R, ability to reset orientation of the magnetic spins of the pinning layer at a lower temperature and an option of employing a negative ferromagnetic coupling field $H_f$ between the pinned layer structure and the free layer structure. A typical reset of a platinum manganese (PtMn) pinning layer requires annealing at a temperature of about 250° C. for five hours in the presence of a field perpendicular to the ABS. With the present invention the reset can be accomplished by annealing at a temperature of about 220° C. for five hours in the presence of a field perpendicular to the ABS. The advantages are that less magnetoresistive coefficient dr/R will be lost during the annealing and the orientation of the magnetic moments of the shield layers, which is perpendicular to the orientation of the magnetic moment of the pinned layer, will be less affected. By appropriately varying the copper thickness of the free layer a negative ferromagnetic coupling field $H_f$ can be achieved. It is important that the orientation of the magnetic moment of the free layer be maintained substantially parallel to the ABS in a quiescent state (without the application of signal fields from a rotating disk). Forces affecting this orientation are sense current fields from all the conductive layers of the spin valve sensor except the free layer, a net demagnetization field from the pinned layer and the ferromagnetic coupling field from the pinned layer. If the ferromagnetic coupling field is negative it can be employed to offset the net demagnetization field from the pinned layer and/or the sense current field for promoting the desired orientation of the magnetic moment of the free layer.

A further significant advantage provided by the present seed layer structure is the predictability of magnetic heads constructed on different wafers. It is believed that the present seed layer structure has a more repeatable and uniformly defined surface that permits the pinning layer formed thereon to perform in the same manner from wafer to wafer. It should be noted that the improved seed layer structure is also usable with other antiferromagnetic materials for pinning layers, such as nickel manganese (NiMn), iridium manganese (IrMn) and iron manganese (FeMn).

An object of the present invention is to provide a seed layer structure for a pinning layer that improves the performance and predictability of a spin valve sensor.

Another object is to provide an improved seed layer structure for a platinum manganese (PtMn) pinning layer that makes the platinum manganese (PtMn) pinning layer highly desirable for use in a bottom spin valve.

A further object is to provide a seed layer structure for a platinum manganese (PtMn) pinning layer which improves the magnetoresistive coefficient dr/R of a spin valve sensor, improves the texture of all layers constructed on the seed layer structure, enables a reset of the pinning layer at a lower temperature, permits employment of a negative ferromagnetic coupling field for balancing the magnetic moment of the free layer and results in predictable performance of magnetic heads from wafer to wafer.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
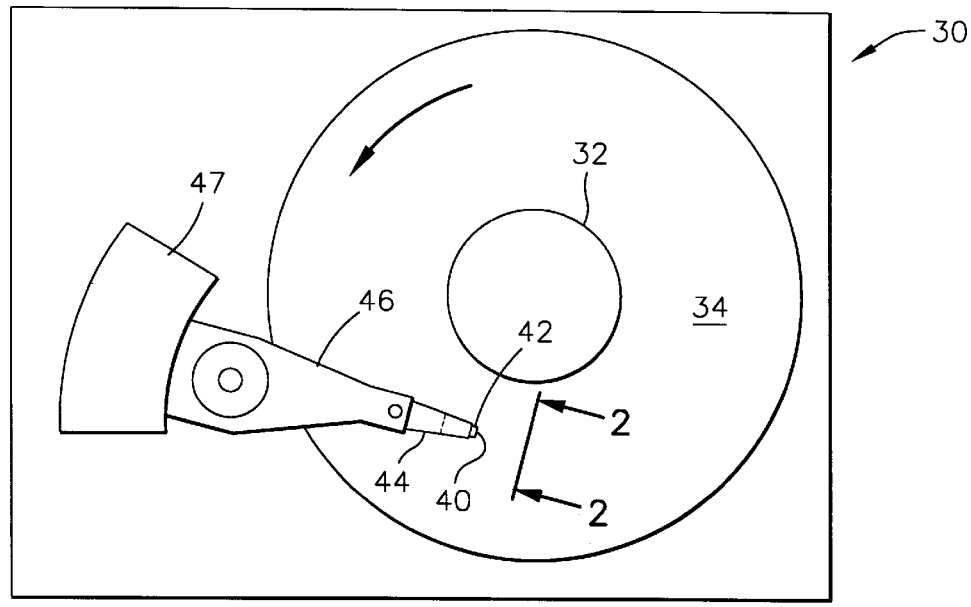
FIG. 1 is a planar view of an exemplary magnetic disk drive.
Figure 2:
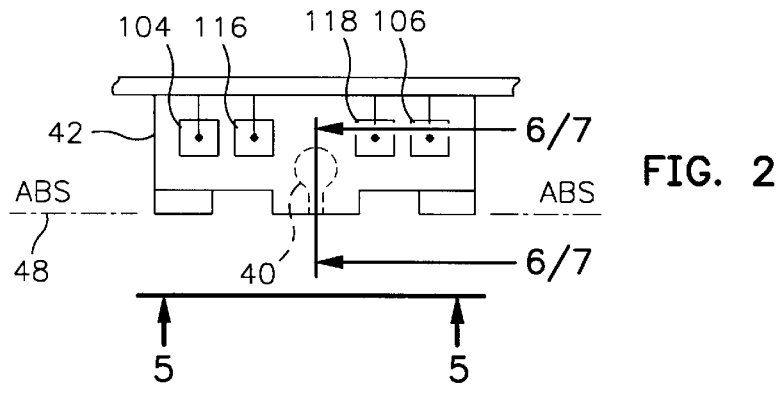
FIG. 2 is an end view of a slider with a magnetic head of the disk drive as seen in plane 2—2.
Figure 3:
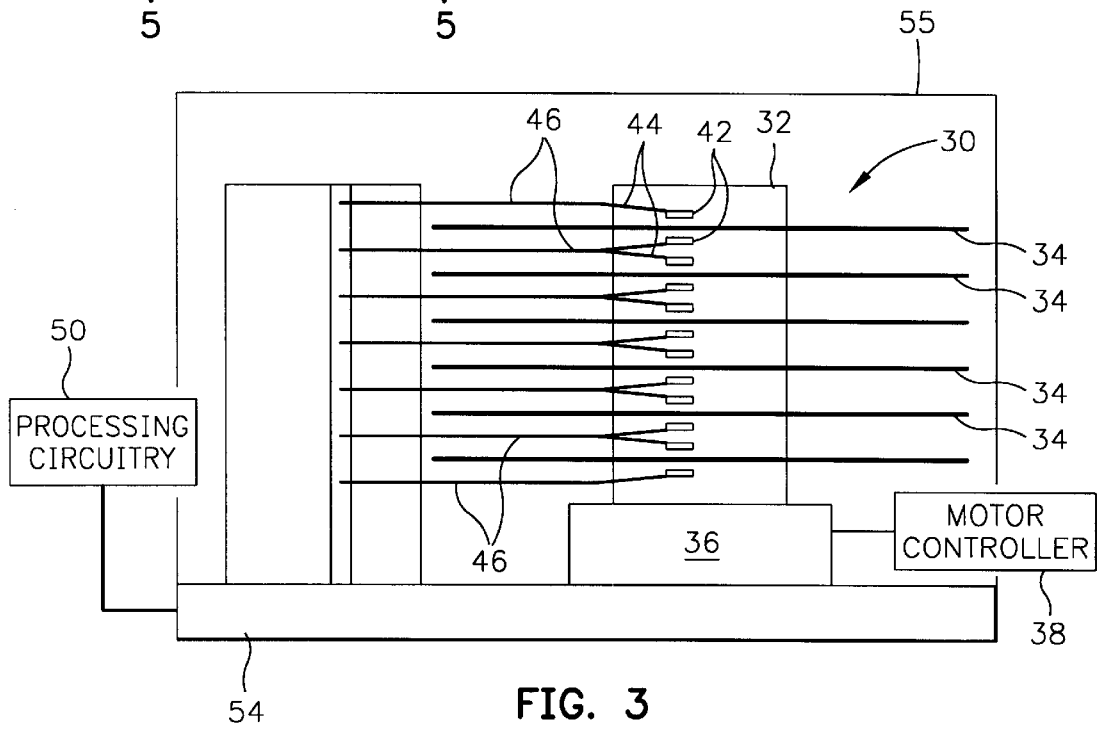
FIG. 3 is an elevation view of the magnetic disk drive wherein multiple disks and magnetic heads are employed.
Figure 4:
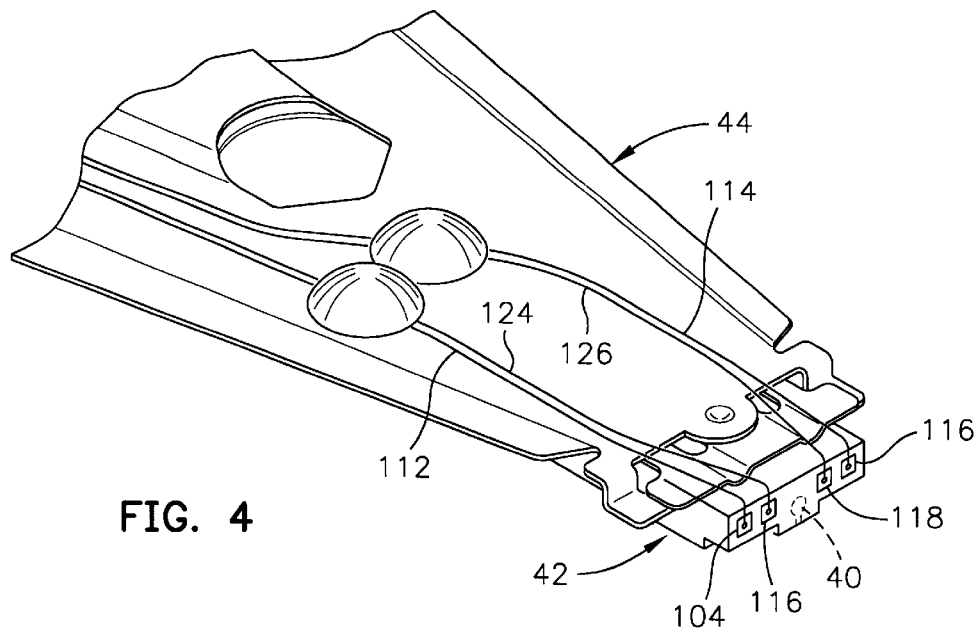
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 supports a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
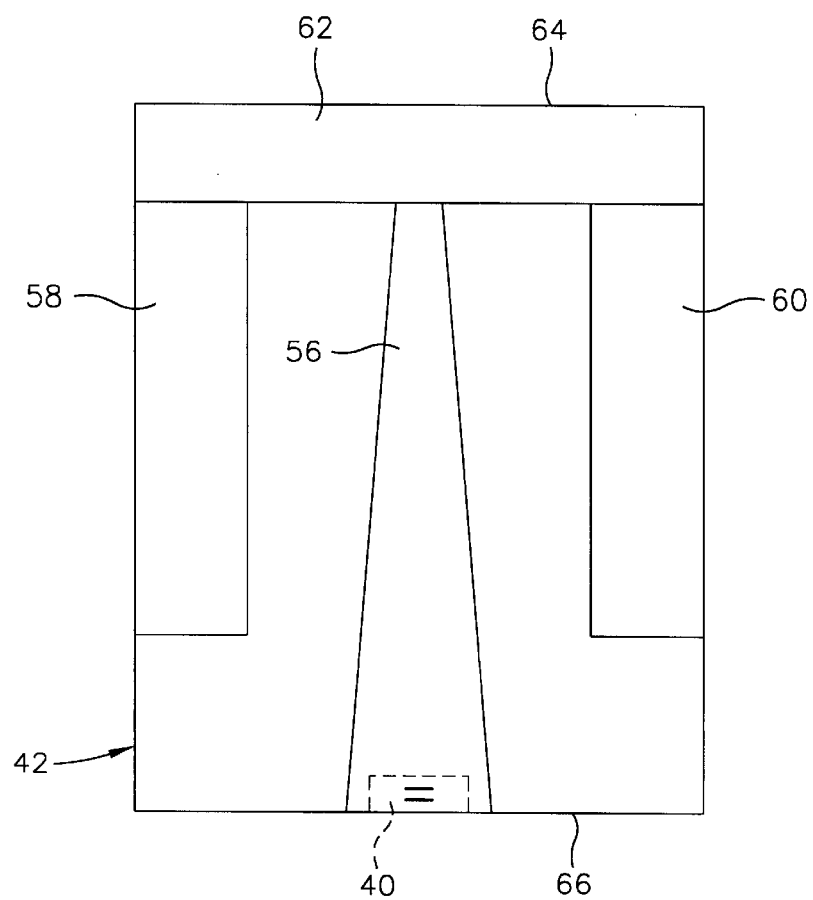
FIG. 5 is an ABS view of the slider taken along plane 5—5 of FIG. 2.

FIG. 5 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
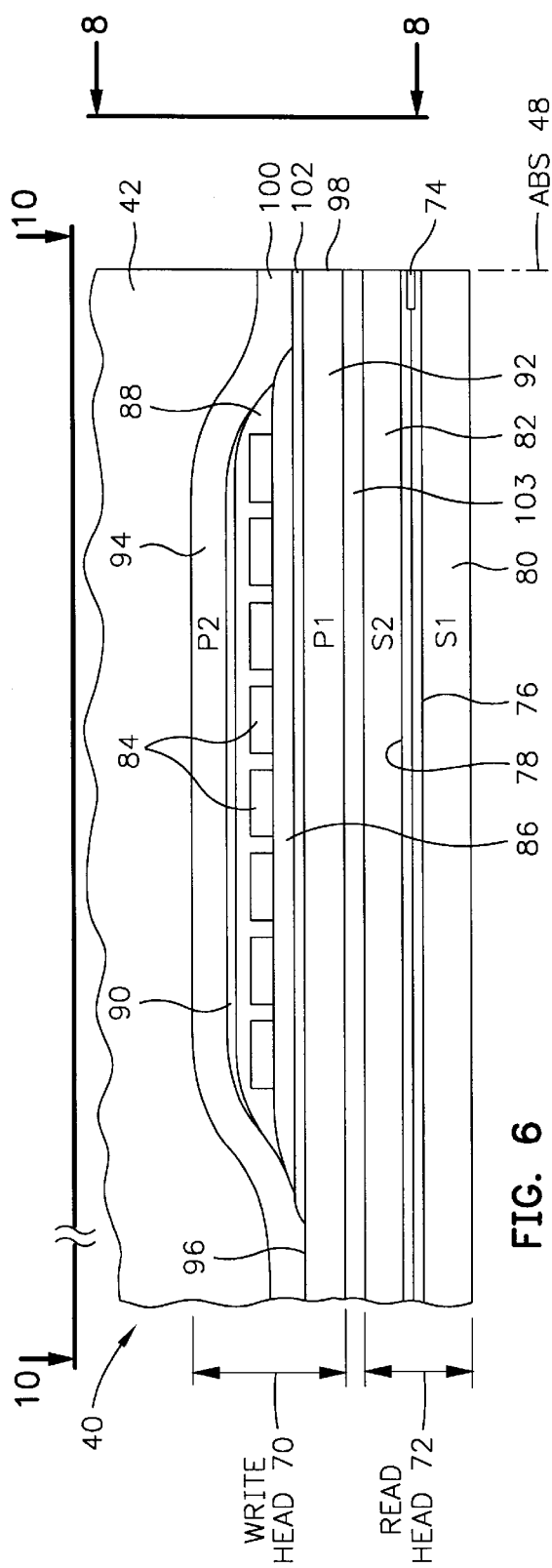
FIG. 6 is a partial view of the slider and a piggyback magnetic head as seen in plane 6—6 of FIG. 2.
Figure 8:
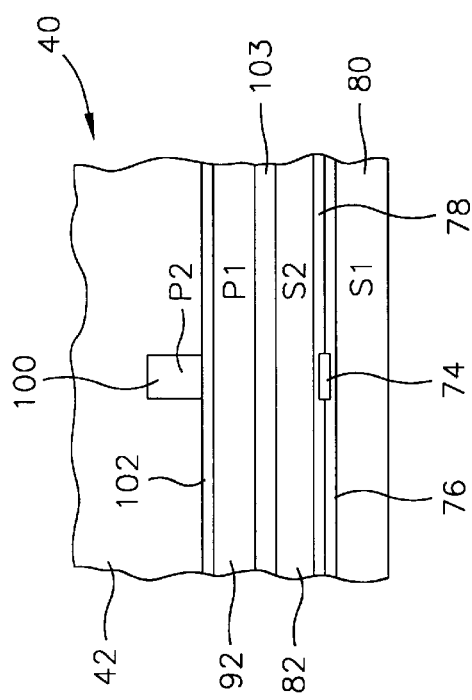
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 10:
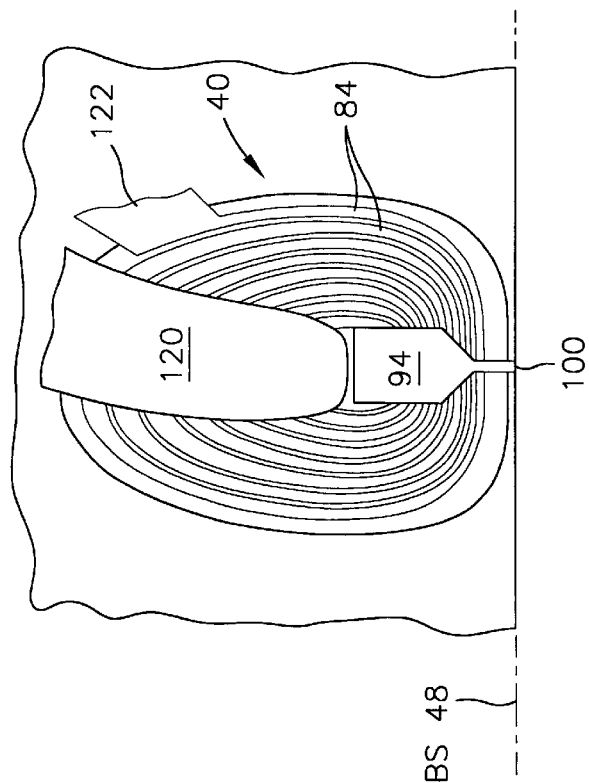
FIG. 10 is a view taken along plane 10—10 of FIG. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 7:
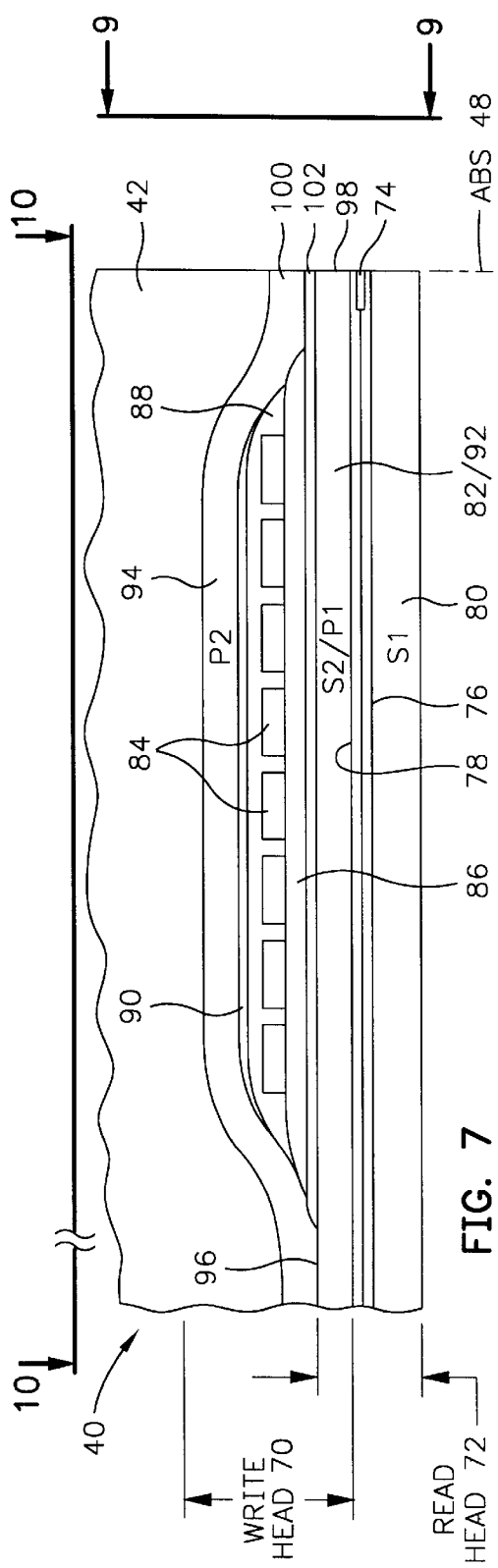
FIG. 7 is a partial view of the slider and a merged magnetic head as seen in plane 7—7 of FIG. 2.
Figure 9:
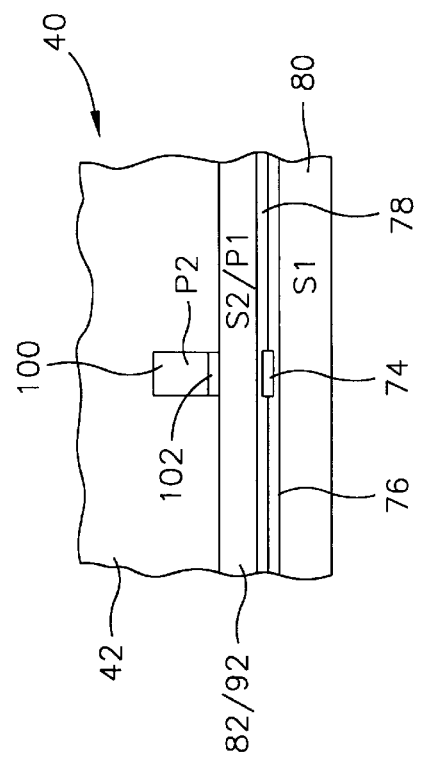
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
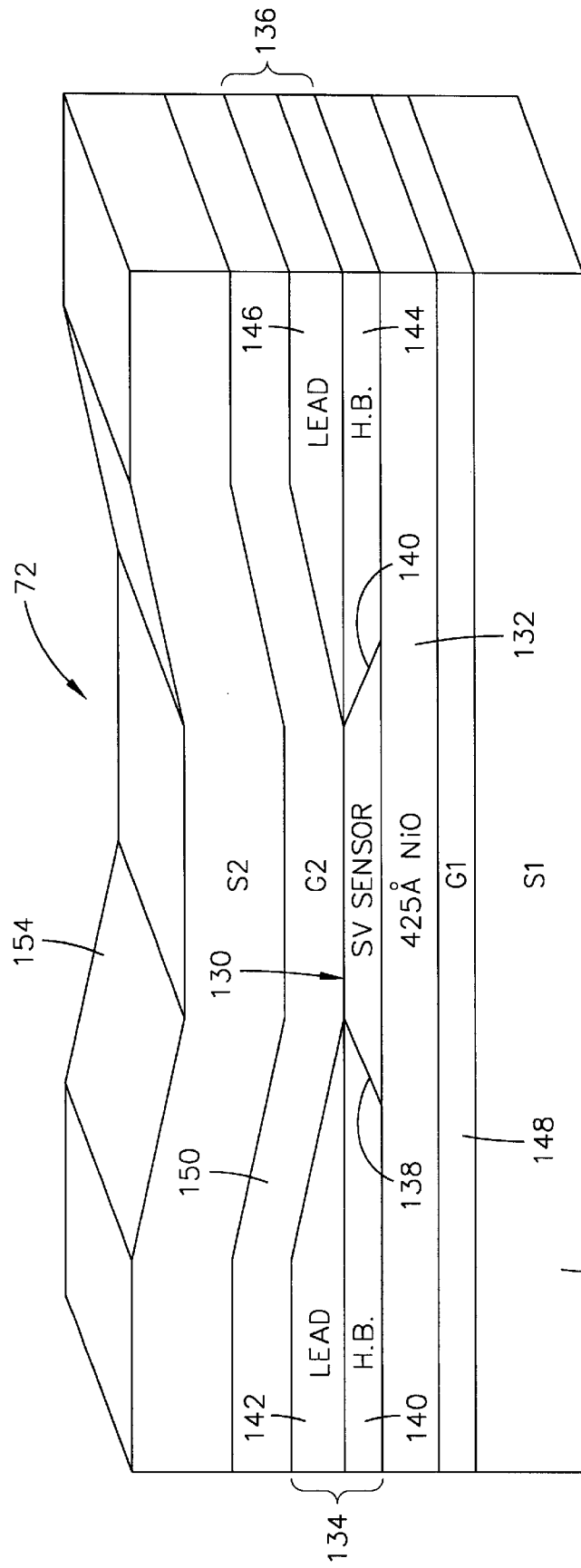
FIG. 11 is an isometric ABS illustration of an exemplary read head which employs a spin valve sensor longitudinally biased by hard biasing layers.

FIG. 11 is an isometric ABS illustration of a read head 72 which has a spin valve sensor 130 with a pinning layer 132 which is typically nickel oxide (NiO). First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037. The first hard bias and lead layers include a first hard bias layer 140 and a first lead layer 142 and the second hard bias and lead layers 136 include a second hard bias layer 144 and a second lead layer 146. The hard bias layers 140 and 144 cause magnetic flux to extend longitudinally through the spin valve sensor 130 for stabilizing magnetic domains of the free layer. The spin valve sensor 130 and the first and second hard bias and lead layers 134 and 136 are located between nonmagnetic electrically insulative first and second read gap layers 148 and 150. The first and second read gap layers 148 and 150 are, in turn, located between first and second shield layers 152 and 154.

EXAMPLE 1

First Embodiment of the Present Spin Valve Sensor

Figure 12:
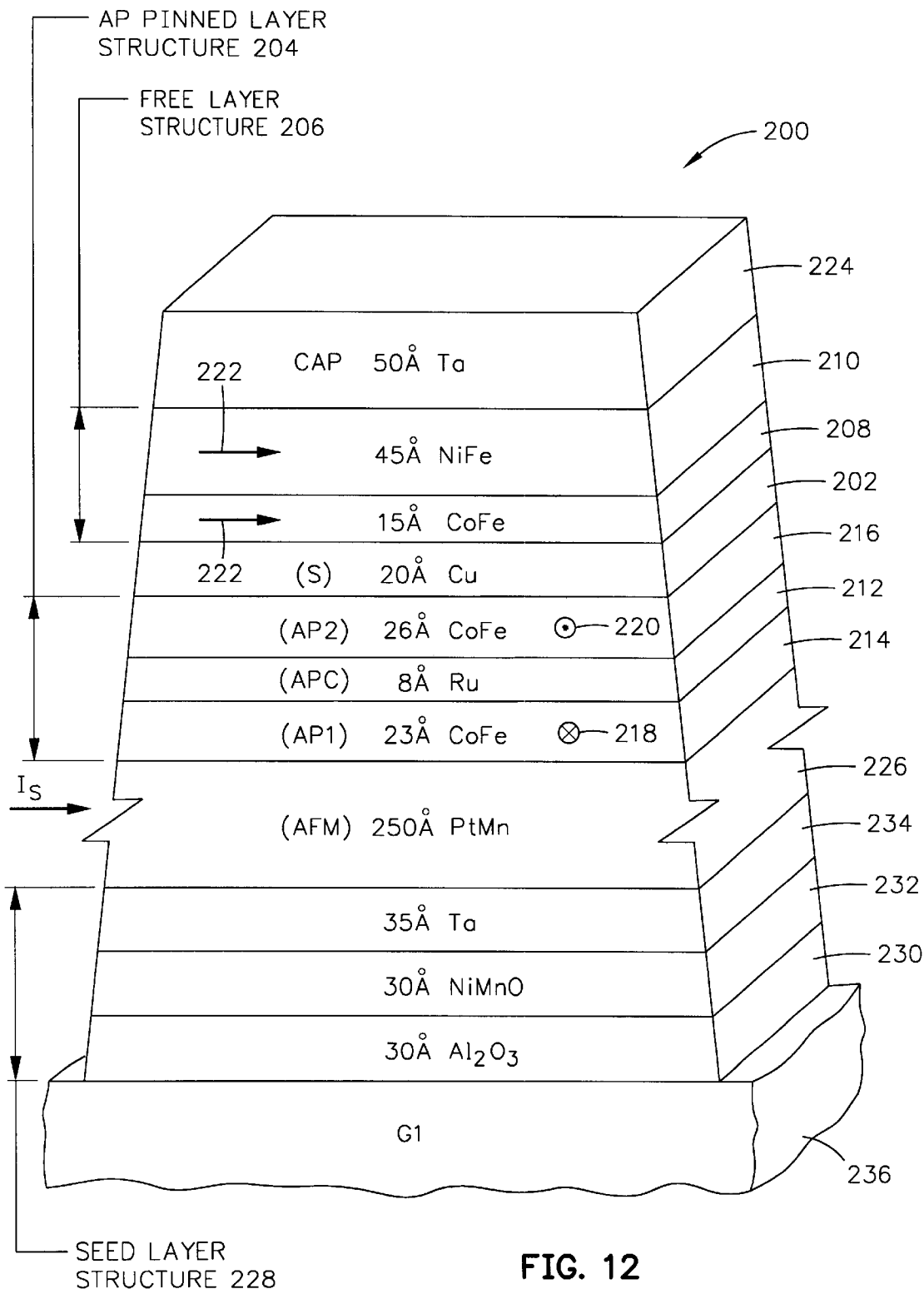
FIG. 12 is an ABS illustration of a first embodiment of the present spin valve sensor.

FIG. 12 shows an ABS illustration of a first embodiment 200 of the present spin valve sensor. The spin valve sensor 200 includes a nonmagnetic conductive spacer layer (S) 202 which is located between an antiparallel (AP) pinned layer structure 204 and a free layer structure 206. The free layer structure 206 may include first and second layers 208 and 210 wherein the first layer is cobalt iron (CoFe) and the second layer is nickel iron (NiFe). It has been found that the cobalt iron (CoFe) enhances the magnetoresistive coefficient dr/R of the spin valve sensor. The AP pinned layer structure 204 may include an antiparallel coupling layer 212 which is located between first and second AP pinned layers (AP1) 214 and (AP2) 216.

The first AP pinned layer 214 has a magnetic moment 218 which is directed perpendicular to the ABS, such as into the paper as shown in FIG. 12, and, because of antiparallel coupling with the second AP pinned layer 216, the second AP pinned layer 216 has a magnetic moment 220 that is antiparallel to the magnetic moment 218. The free layer structure 206 has a magnetic moment 222 which is directed parallel to the ABS, such as from left to right as shown in FIG. 12. A sense current Is is conducted through the spin valve sensor by the processing circuitry 50 shown in FIG. 3. When the spin valve sensor 200 receives positive or negative signal fields from the rotating disk 34 in FIG. 1 the magnetic moment 222 of the free layer structure 206 rotates into or out of the page causing an increase or decrease in resistance of the spin valve sensor to the sense current $I_S$ because of the rotation of the magnetic moment 222 relative to the magnetic moment 220 of the second AP pinned layer 216. The resistance changes cause potential changes in the sense current circuit which are detected by the processing circuitry 50 in FIG. 3 as playback signals. It should be understood that the directions of the sense current $I_S$ and the magnetic moments 218, 220 and 222 may optionally be antiparallel to that shown in FIG. 12. A cap layer 224 is provided on the free layer structure 206 for protecting the structure from subsequent processing steps.

The magnetic moment 218 of the first AP pinned layer 214 is pinned in its orientation by an antiferromagnetic (AFM) pinning layer 226 which is preferably platinum manganese (PtMn). The magnetic spins of the pinning layer 226 are set by annealing the spin valve sensor in the presence of a magnetic field which is directed perpendicular to and into the page which is the same direction as the magnetic moment 218. During annealing the magnetic moment 218 of the first AP pinned layer 214 orients the magnetic spins of the pinning layer 226 in the same direction, namely perpendicular to the ABS and into the paper. After annealing and relaxing the applied field the magnetic spins of the pinning layer 226 are set in their orientations perpendicular to and into the paper for pinning the magnetic moment 218 of the first AP pinned layer perpendicular to and into the paper as shown. As discussed hereinabove, at operating temperatures of the magnetic disk drive, shown in FIG. 3, a portion of the magnetic spins of the pinning layer 226 may rotate in response to fields oriented in any direction other than perpendicular to and into the paper which will lessen a pinning field $H_P$ between the pinning layer 226 and the pinned layer 214. Since platinum manganese (PtMn) has a higher blocking temperature than the nickel oxide (NiO) pinning layer 132 in FIG. 11, the platinum manganese (PtMn) pinning layer 226 will have less rotation of its magnetic spins and improved thermal stability.

In the present invention the spin valve sensor 200 is constructed on a seed layer structure 228 with the bottom surface of the pinning layer 226 interfacing a top surface of the seed layer structure. The seed layer structure 228 includes first, second and third seed layers 230, 232 and 234 wherein the first seed layer 230 is aluminum oxide ($Al_2O_3$), the second seed layer 232 is nickel manganese oxide (NiMnO) and the third seed layer is tantalum (Ta). The first seed layer 230 is located on and directly interfaces the first gap layer (G1), which may be the same as the gap layer 148 in FIG. 11 and is preferably aluminum oxide ($Al_2O_3$). Preferred thicknesses for the layers of the seed layer structure 228 are 30 Å for the first layer 230, 30 Å for the second layer 232 and 35 Å for the third layer 234. Exemplary thicknesses and materials for the layers of the spin valve sensor 200 are 250 Å of platinum manganese (PtMn) for the pinning layer 226, 23 Å of cobalt iron (CoFe) for the first AP pinned layer 214, 8 Å of ruthenium (Ru) for the antiparallel coupling layer 212, 26 Å of cobalt iron (CoFe) for the second AP pinned layer 216, 20 Å of copper (Cu) for the spacer layer 202, 15 Å of cobalt iron (CoFe) for the first free layer 208, 45 Å of nickel iron (NiFe) for the second free layer 210 and 50 Å of tantalum (Ta) for the cap layer 224.

The magnetoresistive coefficient dr/R of the spin valve sensor 200 shown in FIG. 12 was measured at 7.2% and the ferromagnetic coupling field $H_F$ between the second AP pinned layer 216 and the free layer structure 206 was measured at −4.4 Oe. The magnetoresistive coefficient dr/R was excellent and the negative ferromagnetic coupling field $H_f$ enabled this field to be employed for counterbalancing other fields for the purpose of maintaining the magnetic moment 222 of the free layer structure 206 parallel to the ABS in a quiescent condition as discussed hereinabove.

EXAMPLE 2

Second Embodiment of the Present Spin Valve Sensor

Figure 13:
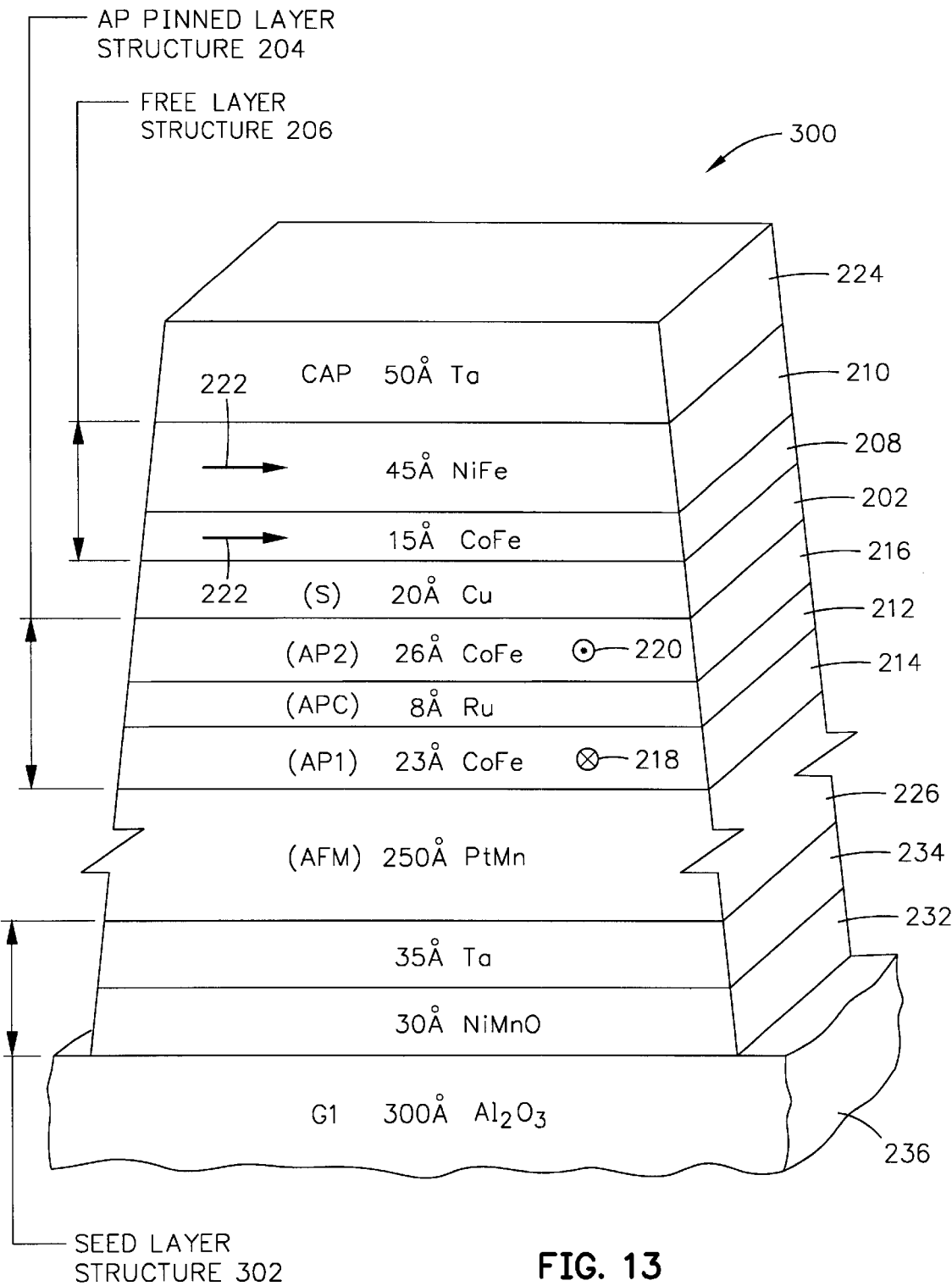
FIG. 13 is an ABS illustration of a second embodiment of the present spin valve sensor.

A second embodiment of the present spin valve sensor 300, shown in FIG. 13, is the same as the spin valve sensor 200, shown in FIG. 12, except the first seed layer 230 is omitted and the second seed layer 232 is located on and directly interfaces the first gap layer 236. In this embodiment the layer 236 functions as a first read gap layer as well as a first seed layer for the seed layer structure 228. The performance of the spin valve sensor 300 in FIG. 13 will be substantially the same as the performance of the spin valve sensor 200 in FIG. 12.

EXAMPLE 3

Third Embodiment of the Present Spin Valve Sensor

Figure 14:
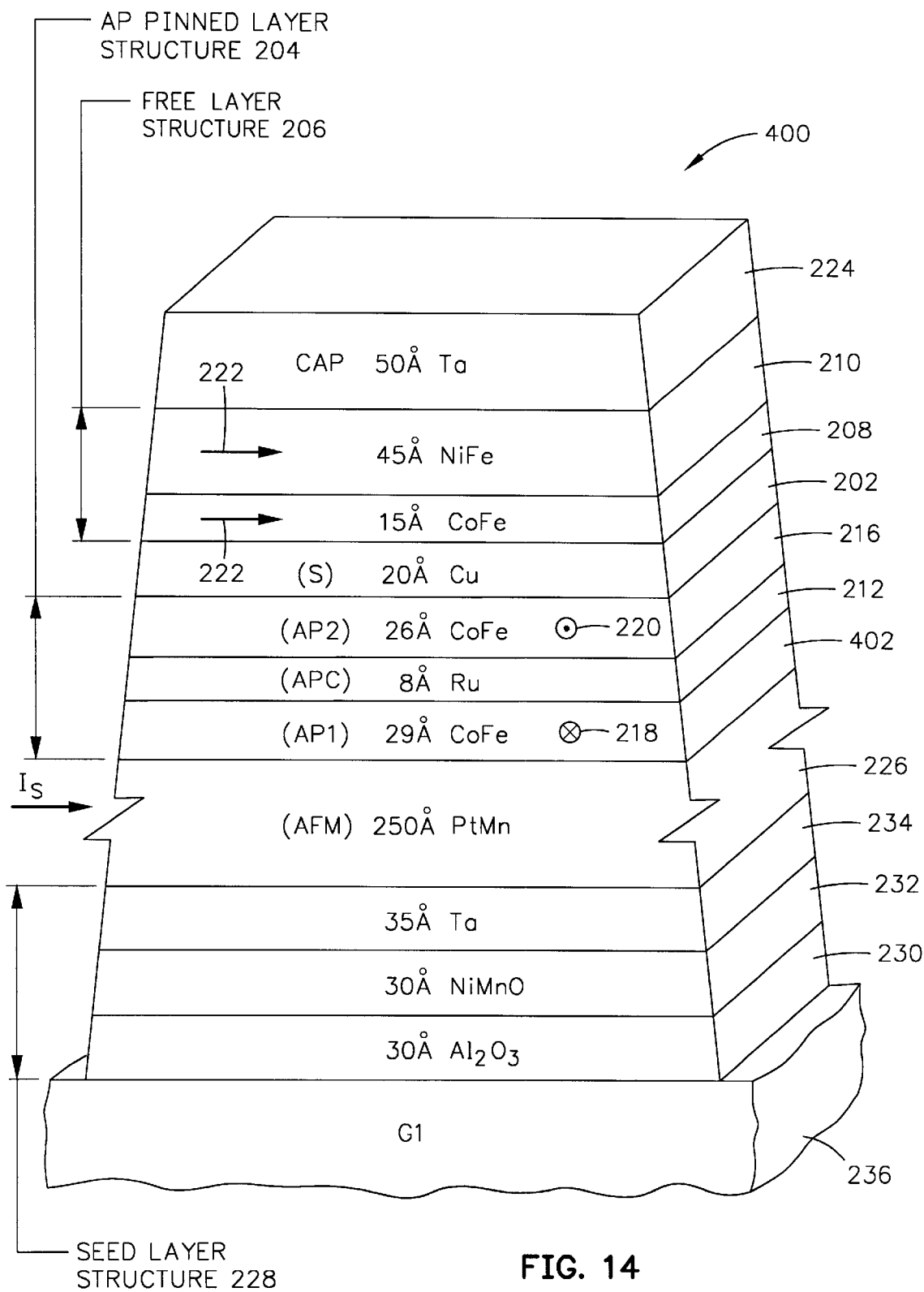
FIG. 14 is an ABS illustration of a third embodiment of the present spin valve sensor.

The spin valve sensor 400 shown in FIG. 14 is the same as the spin valve sensor 200 shown in FIG. 12 except the first AP pinned layer 402 is 29 Å thick instead of 23 Å thick. The magnetoresistive coefficient dr/R of the spin valve sensor 400 was 6.7% and the ferromagnetic coupling field $H_f$ was −3.4 Oe. It is believed that the lower magnetoresistive coefficient dr/R is due to increased shunting of the sense current.

EXAMPLE 4

First Comparative Example

Figure 15:
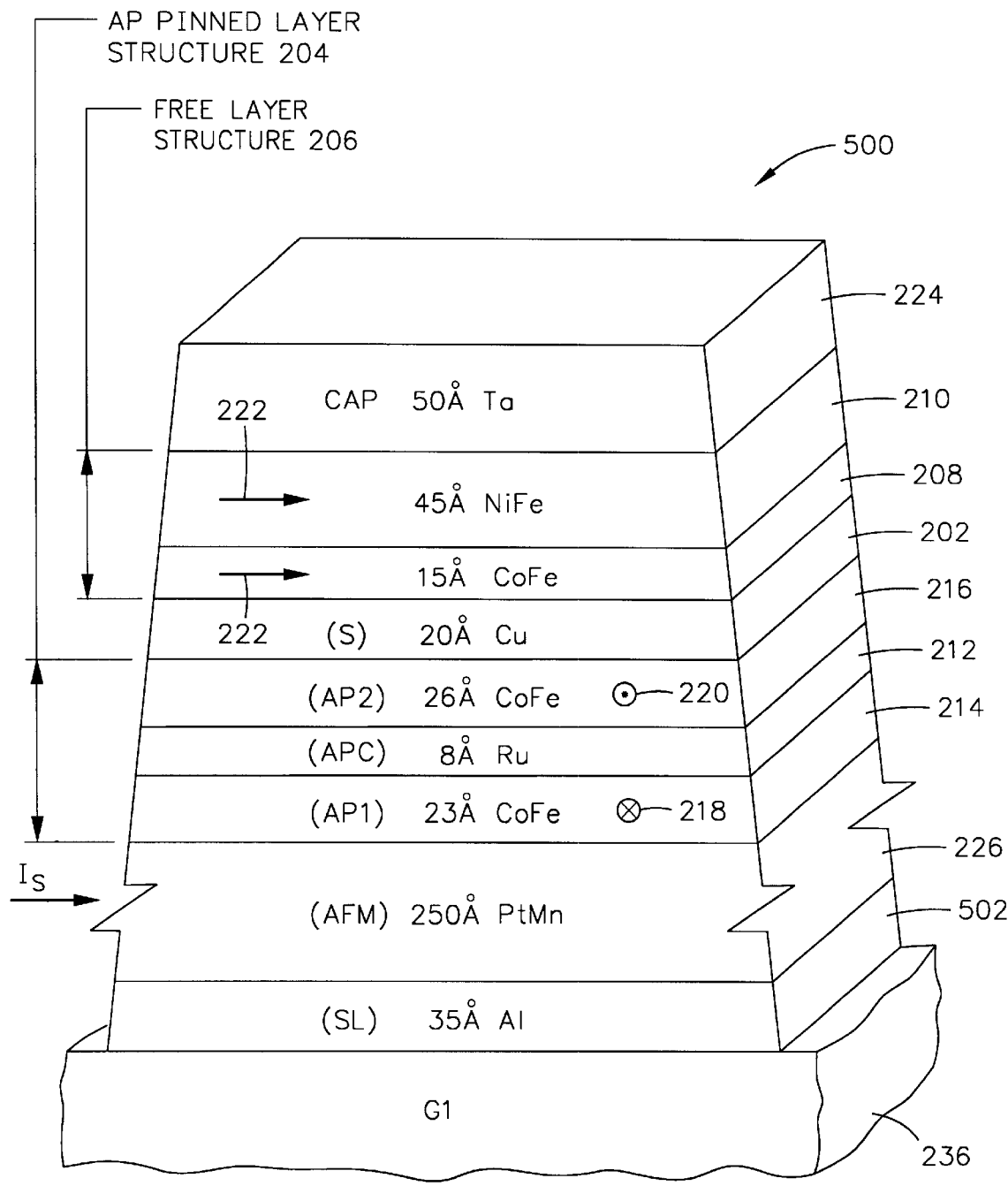
FIG. 15 is an ABS illustration of a first comparative example of a spin valve sensor.

The spin valve sensor 500, shown in FIG. 15, is the same as the spin valve sensor 200, shown in FIG. 12, except the seed layer structure omits the seed layers 232 and 234 in FIG. 12 and is simply a single seed layer (SL) 502 of aluminum (Al) which was 35 Å thick. The aluminum (Al) seed layer 502 is located between and directly interfaces the first gap layer 236 and the pinning layer 226.

Figure 16:
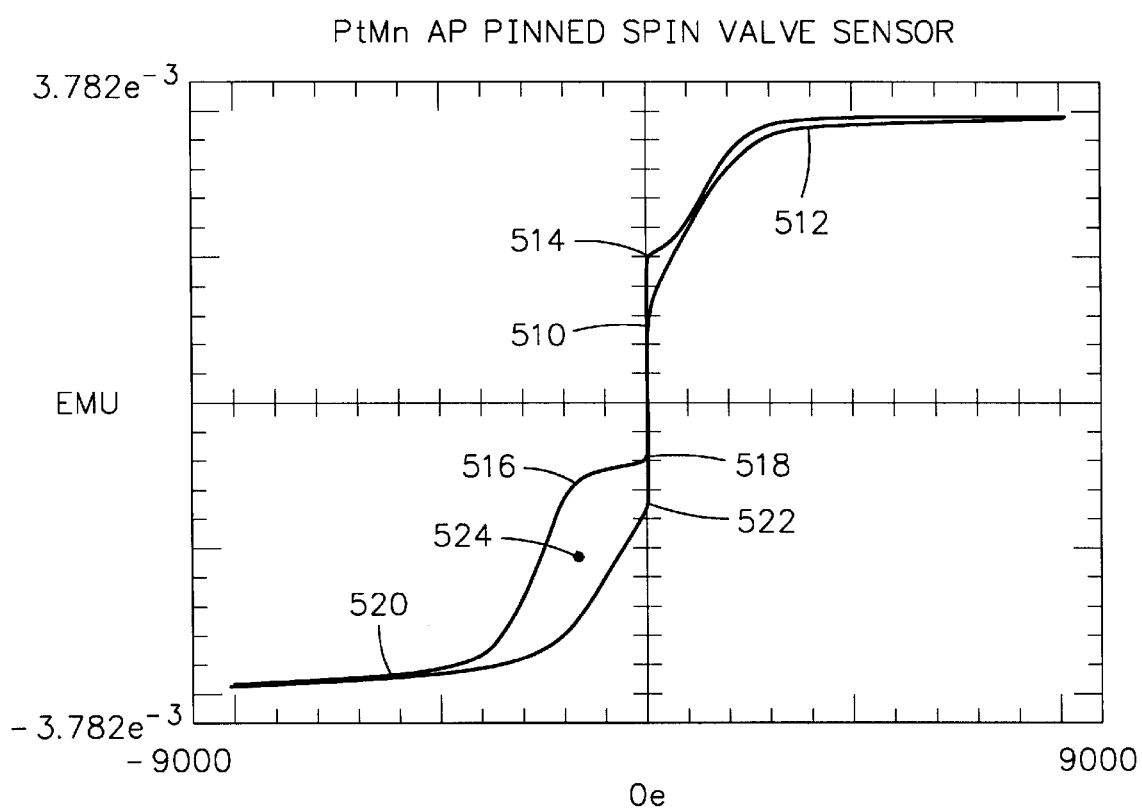
FIG. 16 is M/H graph for the spin valve sensor shown in FIG. 15.

FIG. 16 shows a M/H graph for the spin valve sensor 500 shown in FIG. 15. The ordinate of the graph represents flux density of the AP pinned layer structure in emus and the abscissa represents applied fields with each division representing 900 Oe. The response of the AP pinned layer to positive applied fields is shown in the upper right hand quadrant and the response to the AP pinned layer to the application of negative fields is shown in the lower left hand quadrant. Upon application of the positive applied field the magnetic moment of the AP pinned layer commences to rotate in a substantial manner from the commencement point 514 to a fully rotated and saturation level shown at 512, and upon relaxation the applied field terminates at a point 510. A space between the points 510 and 514 indicates that the magnetic moment of the AP pinned layer did not return to its original position which means that it did not fully recover after the application and relaxation of the positive fields. Upon the application of the negative fields the magnetic moment of the AP pinned layer commences to rotate in a substantial manner at point 516 after its commencement point 518, reaching full rotation and saturation at about point 520. Upon relaxation of the applied negative field the magnetic moment of the AP pinned layer rotates back and terminates at point 522. Again, the space between 518 and 522 means that the magnetic moment of the AP pinned layer did not return to its original orientation and therefore did not fully recover. The exchange coupling field $H_{ex}$ between the pinning and AP pinned layer is shown at 524 which is at the center of the loop in the lower left hand quadrant. In an attempt to obtain full recovery, the spin valve sensor in FIG. 15 was annealed at 270° C. for 5 hours which was ineffective in obtaining the full recovery.

EXAMPLE 5

Fourth Embodiment of the Present Spin Valve Sensor

Figure 17:
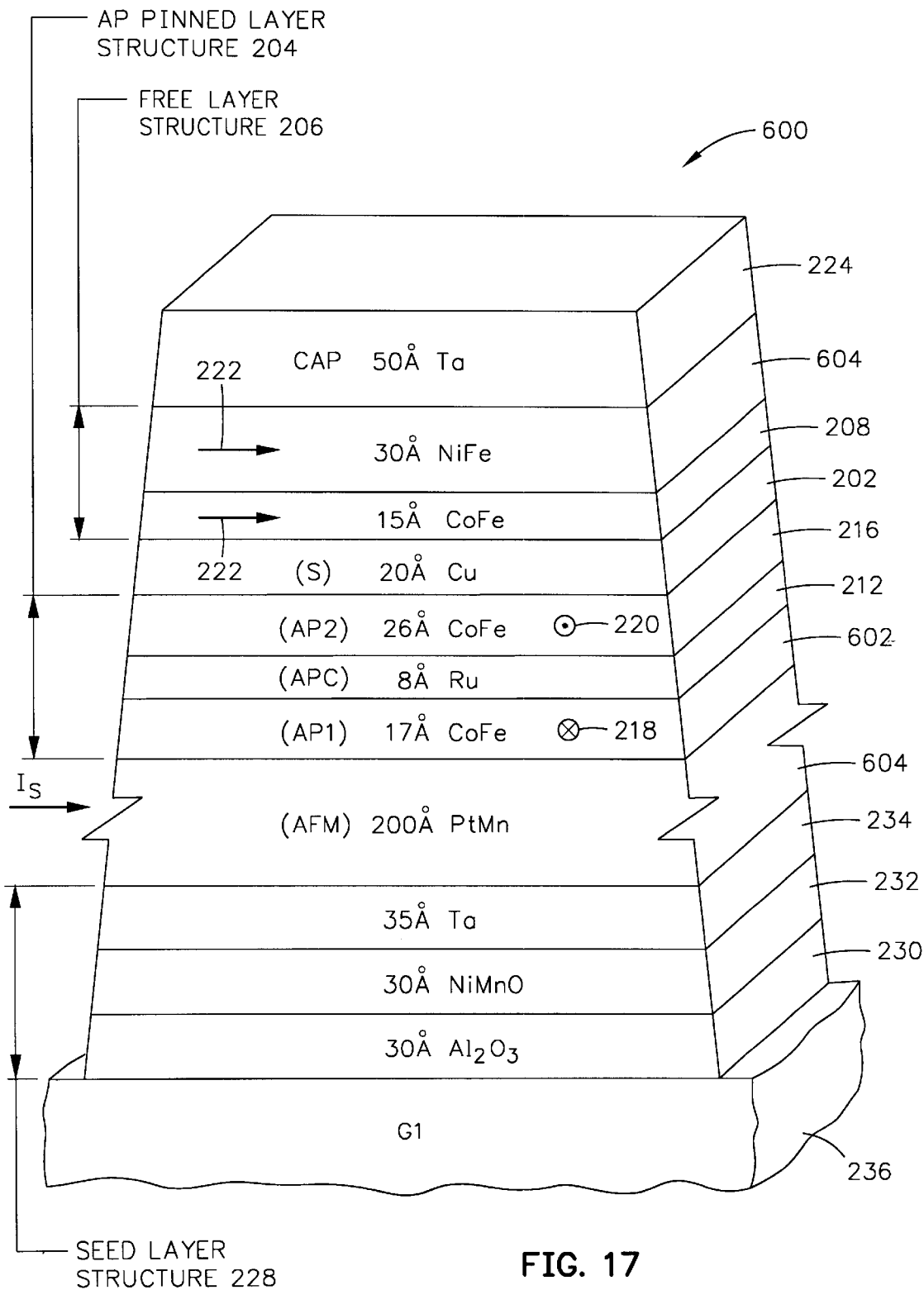
FIG. 17 is an ABS illustration of a fourth embodiment of the present spin valve sensor.

The spin valve 600 shown in FIG. 17 is the same as the spin valve sensor 200 shown in FIG. 12 except the first AP pinned layer 602 is 17 Å thick instead of 23 Å thick. The magnetoresistive coefficient dr/R of the spin valve sensor 600 shown in FIG. 17 was 7.72% and the ferromagnetic coupling field $H_F$ was −3.0 Oe.

Figure 18:
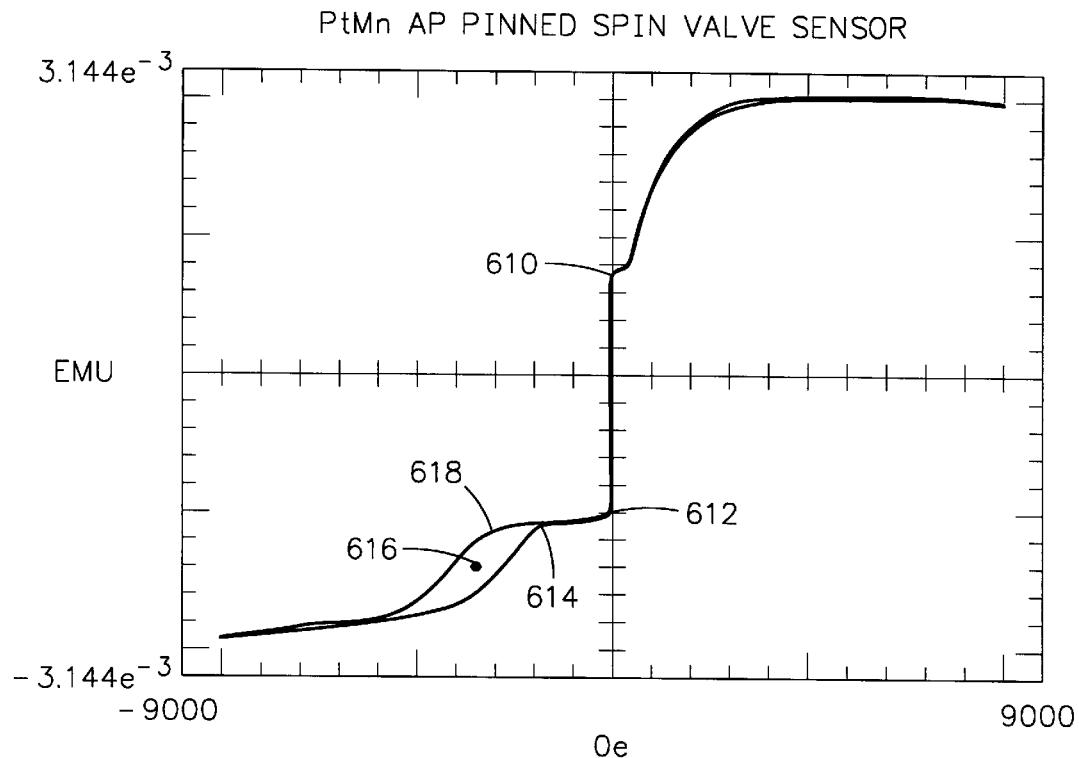
FIG. 18 is a M/H graph for the spin valve sensor shown in FIG. 17.

The M/H graph for the spin valve sensor 600 is shown in FIG. 18. Each division on the abscissa of this M/H graph represents 900 Oe. From the application and relaxation of the applied positive field it can be seen in the upper right hand quadrant that the magnetic moment commenced and terminated at the same point 610 which indicates that there was a full recovery of the magnetic moment of the AP pinned layer to its original orientation. On the application and relaxation of the applied negative field the magnetic moment commenced and terminated at the same point 612 in the lower left hand quadrant which again shows a full recovery of the orientation of the magnetic moment of the AP pinned layer to its original position. In the upper right hand quadrant it can be seen that, upon the application and relaxation of the applied positive field, the orientation of the magnetic moment of the AP pinned layer was the same throughout the application and relaxation of the applied field. In the lower left hand quadrant the orientation of the magnetic moment of the AP pinned layer returned to its original position at about point 614 which is about 1800 Oe. The exchange coupling field $H_{EX}$ is shown at 616 which is about 3000 Oe. Accordingly, the spin valve sensor 600 in FIG. 17 demonstrates full recovery of the orientation of its magnetic moment of the AP pinned layer as compared to a poor recovery of the magnetic moment of the AP pinned layer of the spin valve sensor 500 shown in FIG. 15. Further, the exchange coupling field of the spin valve sensor 600 in FIG. 17 is 3000 Oe as compared to 900 Oe for exchange coupling fields of the spin valve sensor 500 shown in FIG. 15. Also of significance is that the magnetic moment of the AP pinned layer of the spin valve sensor 600 in FIG. 17 did not commence to rotate in a substantial manner until about point 618 in FIG. 18 which demonstrate a highly stable condition.

Figure 19:
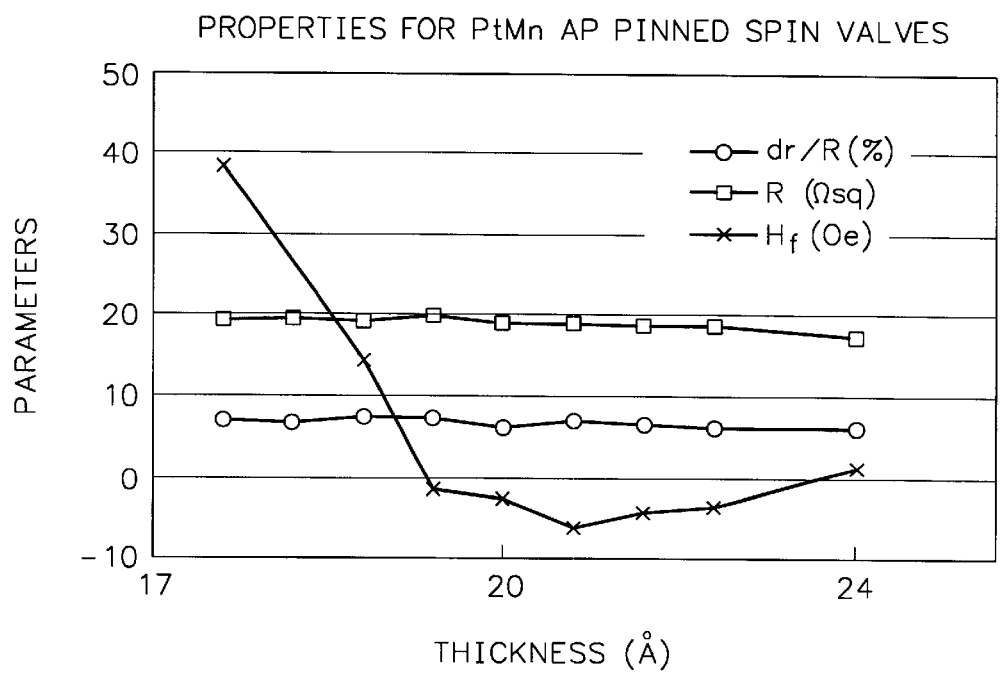
FIG. 19 is a graph showing various parameters for various thicknesses of the copper free layer of the spin valve sensor shown in FIG. 17.

Some of the parameters of the spin valve sensor 600, shown in FIG. 17, versus various thicknesses of the copper spacer layer 202 are shown in FIG. 19. These parameters are magnetoresistive coefficient dr/R shown as circles, resistance R shown as squares and ferromagnetic coupling field $H_F$ shown as Xs. A surprising result was that the ferromagnetic coupling field $H_F$ became negative when the thickness of the copper spacer layer was greater than about 18 Å and less than about 24 Å. Accordingly, the thickness of the copper spacer layer may be adjusted to establish a desired ferromagnetic coupling field $H_F$ for the purpose of balancing other fields acting on the free layer structure 206 so as to maintain the magnetic moment 222 of the free layer structure parallel to the ABS in a quiescent condition as discussed hereinabove.

EXAMPLE 6

Second Comparative Example

Figure 20:
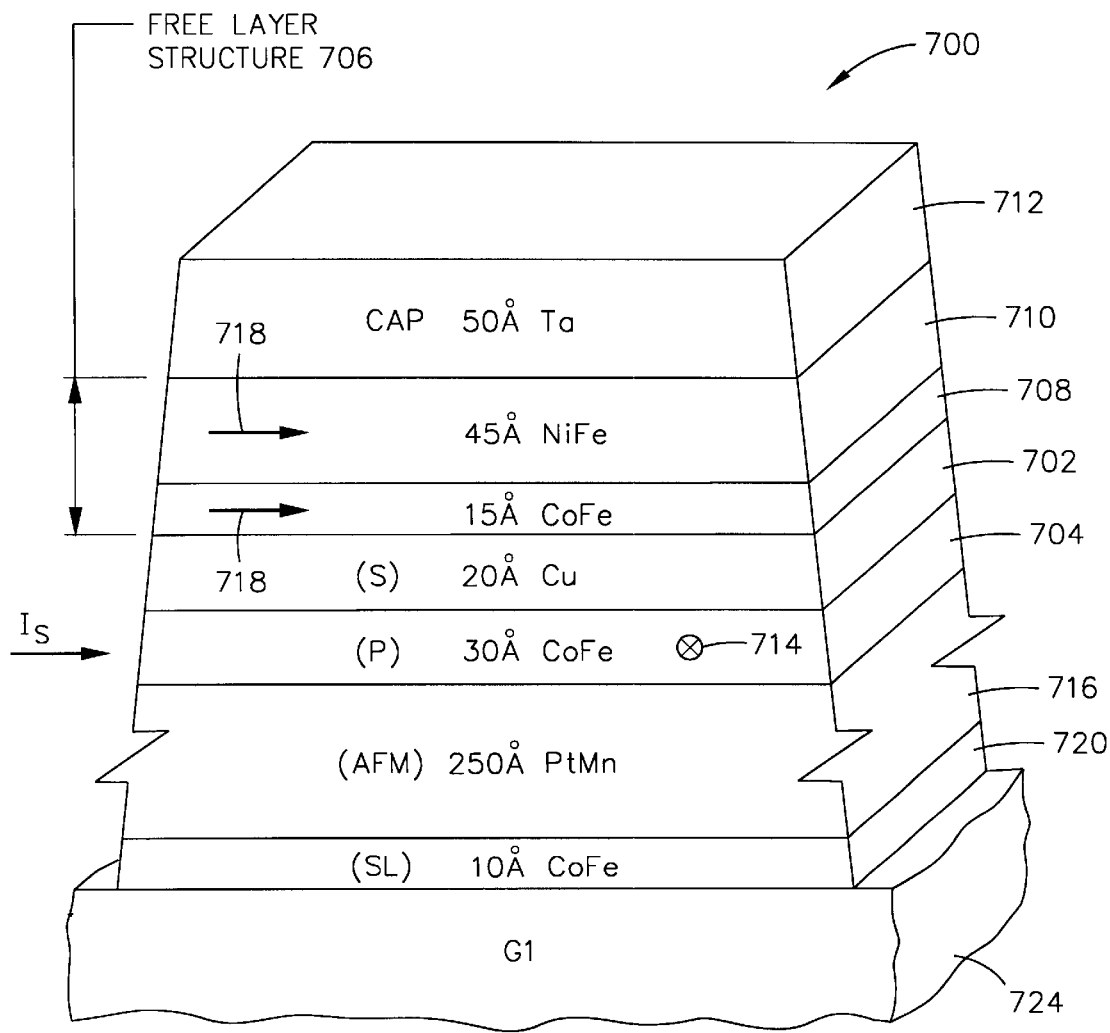
FIG. 20 is an ABS illustration of a second comparative example of a spin valve sensor.

The spin valve sensor 700, shown in FIG. 20, is a simple pinned spin valve sensor which includes a spacer layer (S) 702 located between a pinned layer (P) 704 and a free layer structure 706. The free layer structure 706 includes first and second free layers 708 and 710 wherein the first layer 708 is cobalt iron (CoFe) and the second free layer is nickel iron (NiFe). A cap layer 712 is located on the second free layer 710 to protect it from subsequent processing steps.

A magnetic moment 714 of the pinned layer is pinned in its orientation by an antiferromagnetic (AFM) pinning layer 716. A rotation of the magnetic moment 718 of the free layer structure relative to the magnetic moment 714 in response to signal fields changes the resistance of the spin valve sensor to the sense current $I_S$ as discussed hereinabove.

The thicknesses and materials of the layers of the spin valve sensor are 250 Å of platinum manganese (PtMn) for the pinning layer 716, 30 Å of cobalt iron (CoFe) for the pinned layer 704, 20 Å of copper (Cu) for the spacer layer 702, 15 Å of cobalt iron (CoFe) for the first free layer 708, 45 Å of nickel iron (NiFe) for the second free layer 710 and 50 Å of tantalum (Ta) for the cap layer 712. The 15 Å for the layer 708 is an equivalent nickel iron (NiFe) magnetic thickness. The actual physical thickness of the layer 708 is about 9 Å.

The platinum manganese (PtMn) pinning layer 716 is located directly on and interfaces a seed layer (SL) 720 which is 10 Å of cobalt iron (CoFe). The seed layer 720 is located directly on and interfaces the first gap layer (G1) 724 which may be the same as the gap layer 148 in FIG. 11.

Figure 21:
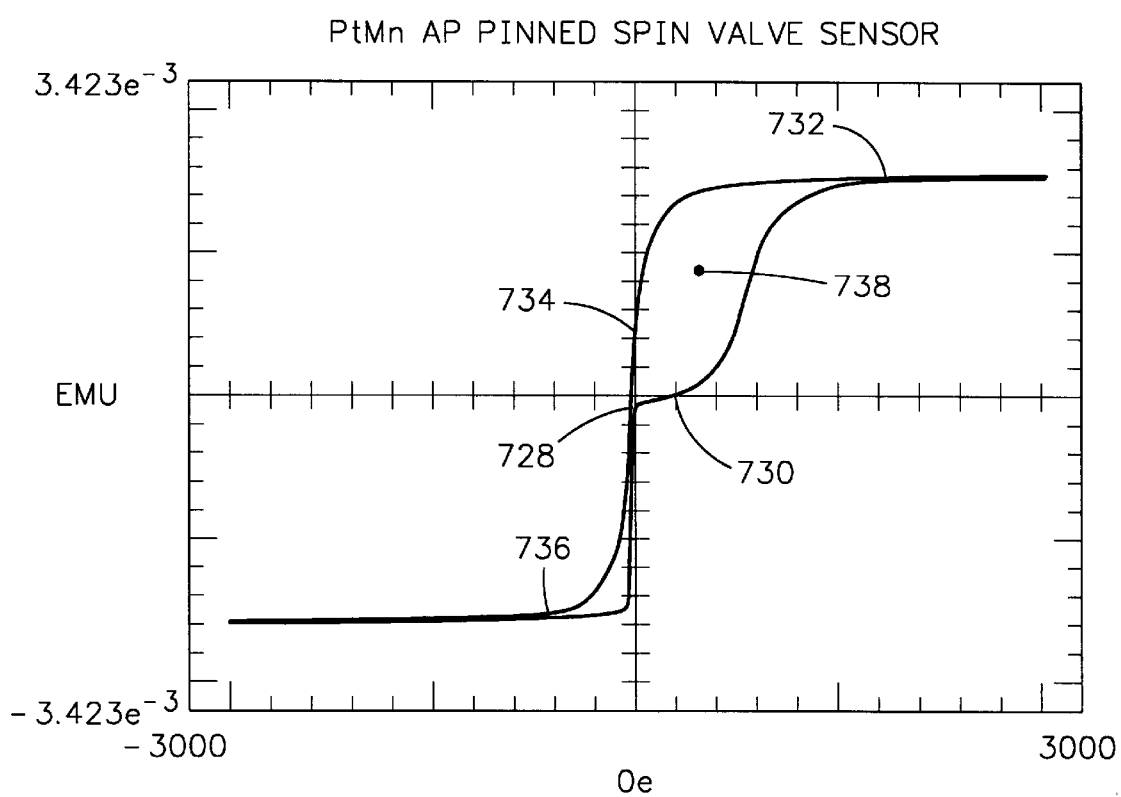
FIG. 21 is a M/H graph for the spin valve sensor shown in FIG. 20.

The M/H graph for the sensor 700 is shown in FIG. 21. Each division on the abscissa is 300 Å and the ordinate is in electromagnetic units (EMU) which indicates the net magnetic moment of the pinned layer. Upon the application of a positive applied field at point 728 the magnetic moment 714 of the pinned layer in FIG. 20 commences to rotate in a substantial manner at approximately point 730 which is about 300 Oe. The pinned layer saturates at point 732 which occurs at an applied field of about 1800 Oe. Upon relaxation of the positive applied field to zero the pinned layer returns to point 734. The space between points 728 and 734 indicates that the magnetic moment of the pinned layer did not return to its original orientation at point 728. Only upon application of a negative applied field of about 600 Oe at point 736 did the magnetic moment return to its original orientation. The exchange coupling field $H_{ex}$ is shown at point 738 which is about 450 Oe.

EXAMPLE 7

Third Comparative Example

Figure 22:
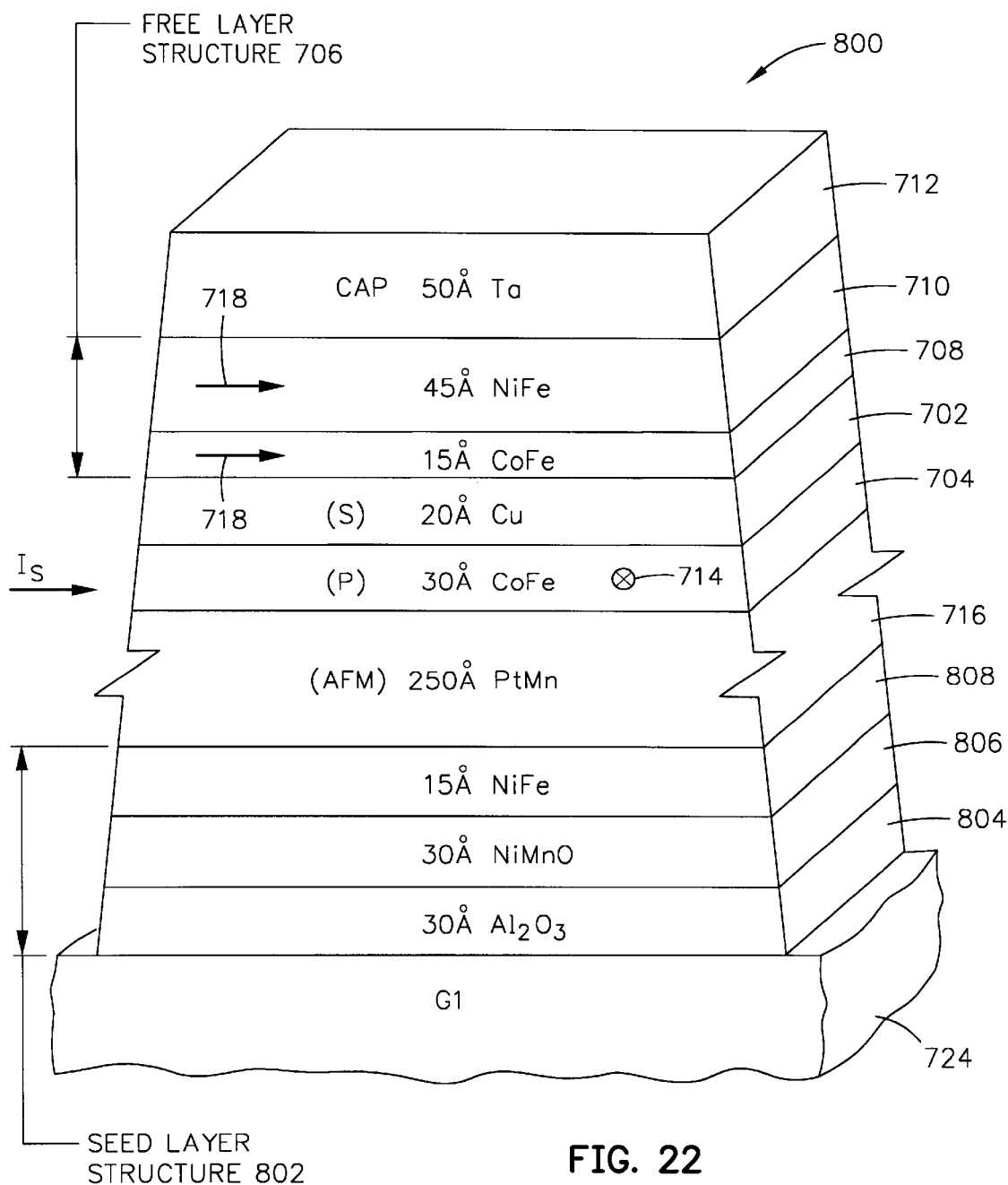
FIG. 22 is an ABS illustration of a third comparative example of a spin valve sensor.

The spin valve sensor 800, shown in FIG. 22, is the same as the spin valve sensor 700, shown in FIG. 20, except the seed layer 720 in FIG. 20 is omitted and a seed layer structure 802 is provided. The seed layer structure 802 includes first, second and third seed layers 804, 806 and 808 wherein the first seed layer 804 is 30 Å of aluminum oxide ($Al_2O_3$), the second seed layer 806 is 30 Å of nickel manganese oxide (NiMnO) and the third seed layer 808 is 15 Å of nickel iron (NiFe).

Figure 23:
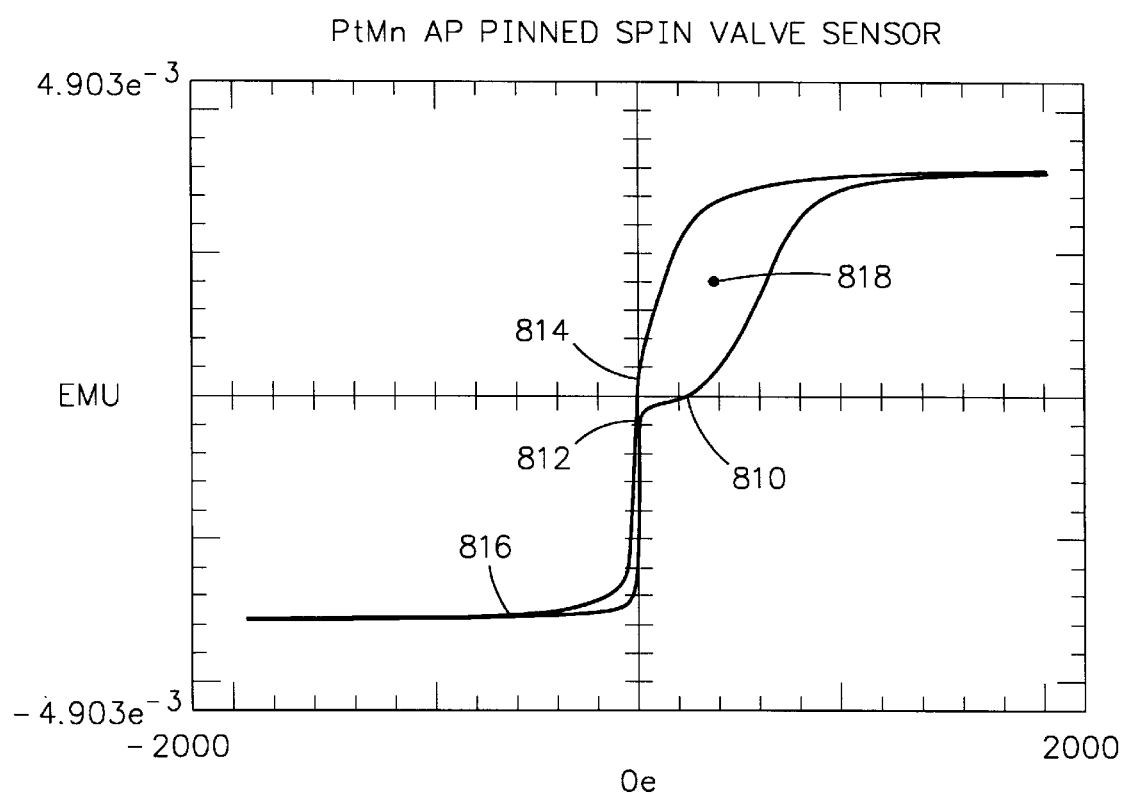
FIG. 23 is a M/H graph for the spin valve sensor shown in FIG. 22.

The M/H graph for the spin valve sensor 800 is shown in FIG. 23. Each division on the abscissa of the graph in FIG. 23 is 200 Å. Upon the application of a positive magnetic field it can be seen that the magnetic moment 714 of the pinned layer in FIG. 22 commences to rotate in a substantial manner at about point 810 which is about 200 Oe. The difference between points 812 and 814 indicates that the pinned layer did not fully recover. Recovery is indicated at point 816 upon the application of a negative applied field of about 400 Oe. The exchange coupling field $H_{ex}$ is shown at 818 which is about 400 Oe.

EXAMPLE 8

Fifth Embodiment of the Present Invention

Figure 24:
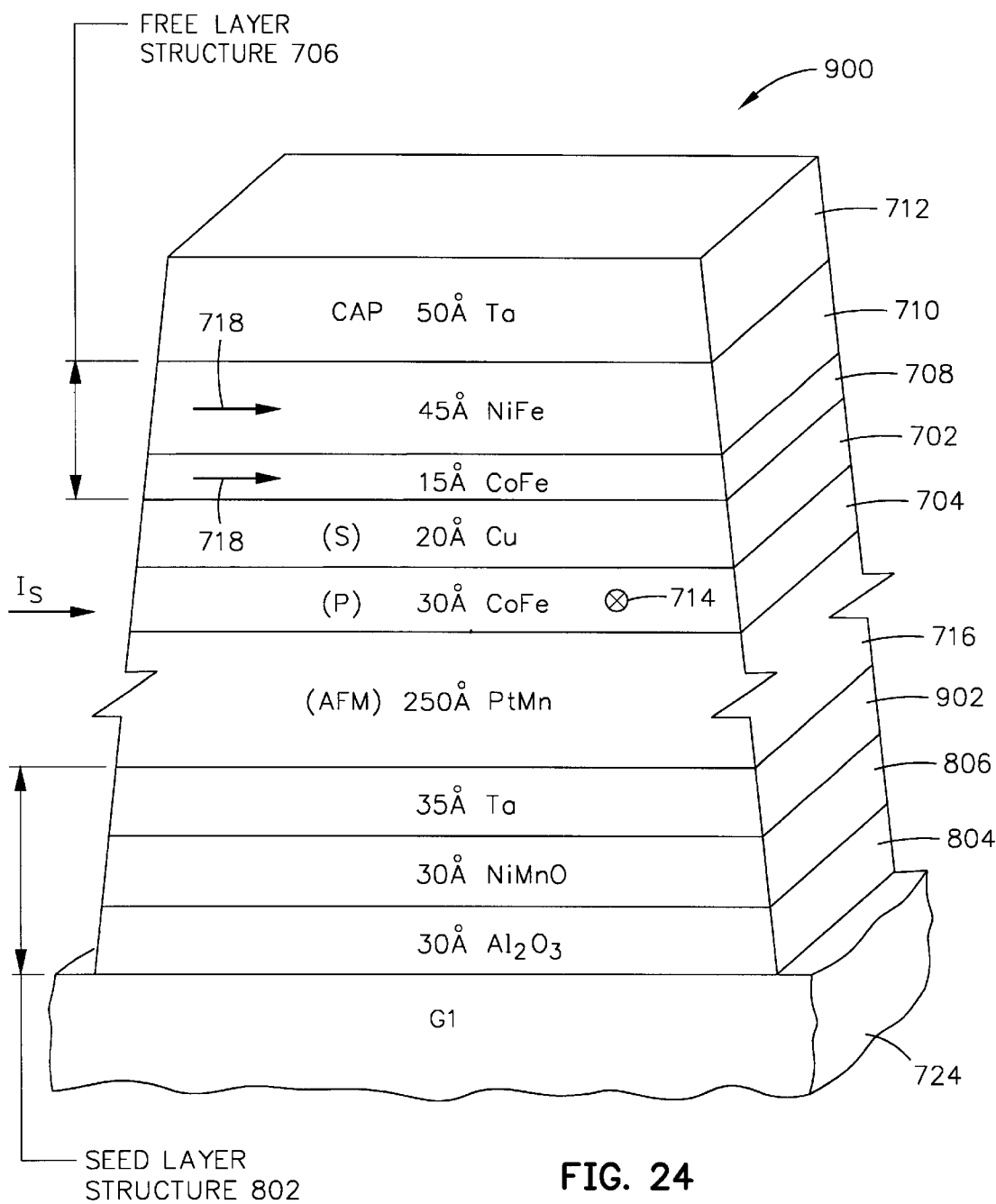
FIG. 24 is an ABS illustration of a fifth embodiment of the present spin valve sensor.

The spin valve sensor 900, shown in FIG. 24, is the same as the spin valve sensor 800, shown in FIG. 22, except the third seed layer 902 is 35 Å of tantalum (Ta).

Figure 25:
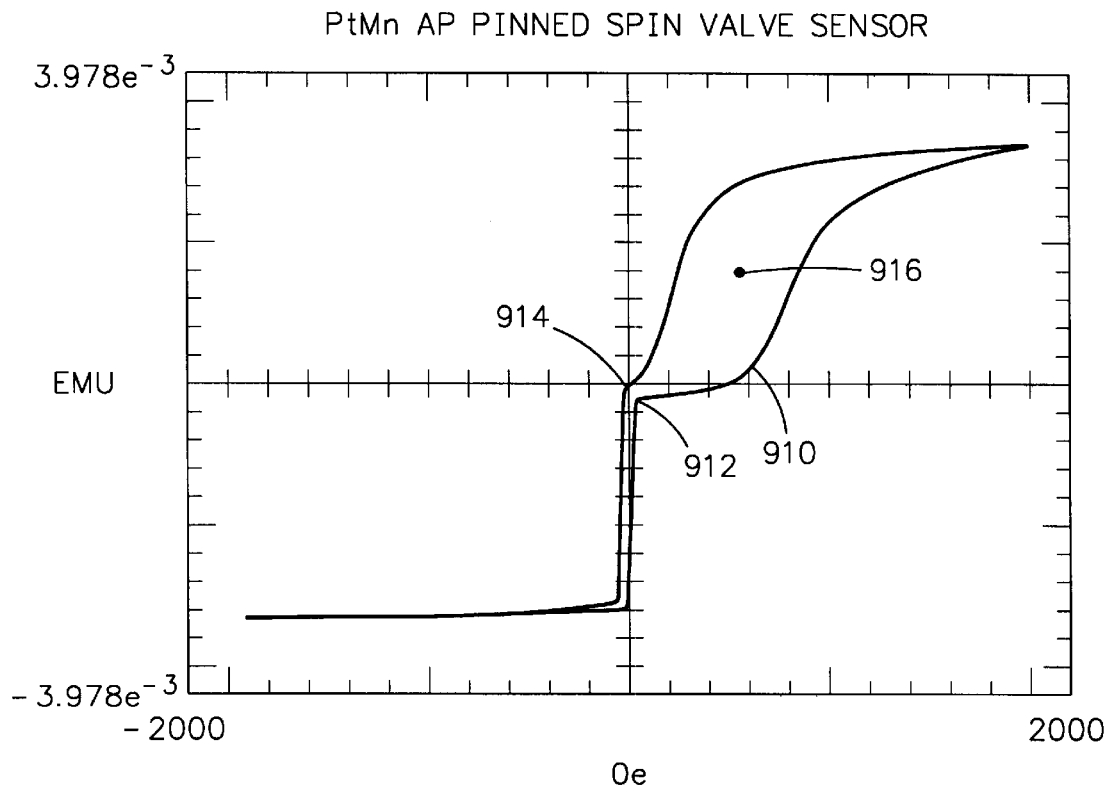
FIG. 25 is a M/H graph for the spin valve sensor shown in FIG. 24.

The M/H graph for the spin valve sensor 900 is shown in FIG. 25. Each division on the abscissa of the M/H graph is 200 Oe. Upon the application of a positive applied field the magnetic moment 714 of the pinned layer in FIG. 24 commences to rotate in a substantial manner at point 910 which is approximately 550 Oe. The 550 Oe in FIG. 25 is a substantial improvement over the 300 Oe shown at point 730 in FIG. 21 and the 200 Oe shown at point 810 in FIG. 23. The points 912 and 914 are nearly the same which indicates near full recovery of the pinned layer upon relaxation of the positive applied field. The exchange coupling field $H_{ex}$ is shown at point 916 in FIG. 25 which is approximately 550 Oe. This is a substantial improvement over the exchange coupling field $H_{ex}$ of 450 Oe shown at point 732 in FIG. 21 and 400 Oe shown at point 812 in FIG. 23. Accordingly, the spin valve sensor 900 shown in FIG. 24 will be significantly more stable than the spin valve sensors 700 and 800 shown in FIGS. 20 and 22.

Figure 26:
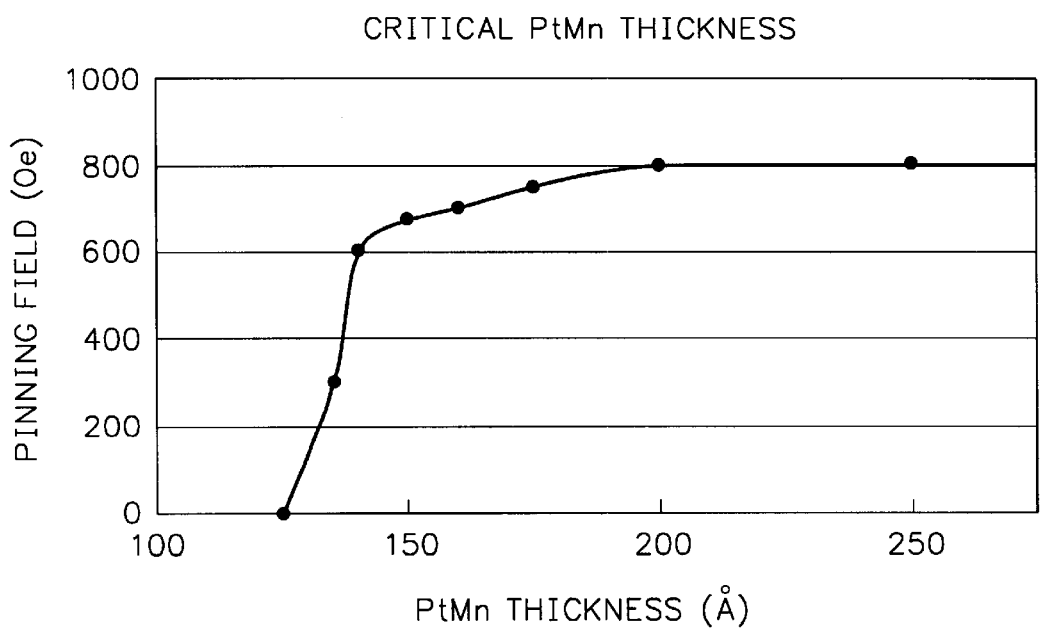
FIG. 26 is a graph showing pinning field versus thicknesses of a platinum manganese pinning layer for the spin valve sensor shown in FIG. 24.

FIG. 26 is a graph illustrating thicknesses in angstroms of the platinum manganese (PtMn) pinning layer versus pinning field $H_p$ in oersteds of the sensor 900 in FIG. 24. Because of the increase in the pinning field, as demonstrated by point 910 in FIG. 25, the thickness of the platinum manganese (PtMn) pinning layer can be reduced to as low as 140 Å and still perform in a satisfactory manner. Accordingly, with the present invention the thickness of the platinum manganese (PtMn) pinning layer can be significantly less than its thickness without the present seed layer structure.

DISCUSSION

In all embodiments the present seed layer structure provides uniform results of the magnetic heads constructed on various wafers. In the past, the parameters, such as magnetoresistive coefficient dr/R, the pinning field $H_P$ and the exchange coupling field $H_{EX}$ varied from wafer to wafer. It is believed that the present seed layer structure provides a more uniform and desirable surface for the pinning layer which, in turn, results in the pinning layer having a more uniform and desirable texture. It is believed that the texture of all the layers subsequently formed on the seed layer have improved texture which results in an improved performance which is predictable from wafer to wafer. It should be understood that the various thicknesses of the layers in the examples are exemplary and may vary as desired.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head, which includes a spin valve sensor, comprising:

the spin valve sensor including:
 a ferromagnetic free layer structure that has a magnetic moment;
 a ferromagnetic pinned layer structure that has a magnetic moment;
 an antiferromagnetic pinning layer exchange coupled to the pinned layer structure for pinning the magnetic moment of the pinned layer structure; and
 a nonmagnetic conductive spacer layer located between the free layer structure and the pinned layer structure;
a seed layer structure interfacing the pinning layer with the pinning layer being located between the seed layer structure and the pinned layer structure; and
the seed layer structure comprising first, second and third seed layers wherein the first seed layer is aluminum oxide ($Al_2O_3$), the second seed layer is nickel manganese oxide (NiMnO) and the third seed layer is tantalum (Ta) wherein the second seed layer is located between and interfaces the first and third seed layers and the third seed layer interfaces the pinning layer.

2. A magnetic read head as claimed in claim 1 wherein the pinning layer is platinum manganese (PtMn).

3. A magnetic read head as claimed in claim 2 wherein the pinned layer structure is an antiparallel (AP) pinned layer structure that includes:
ferromagnetic first and second antiparallel (AP) pinned layers with the first AP pinned layer interfacing the pinning layer; and
an antiparallel (AP) coupling layer located between the first and second AP layers.

4. A magnetic read head as claimed in claim 2 wherein the pinned layer structure is a single ferromagnetic layer.

5. A magnetic read head as claimed in claim 2 including:
the spin valve sensor having first and second side edges;
first and second hard bias and lead layers connected to the first and second side edges of the spin valve sensor;

nonmagnetic nonconductive first and second read gap layers;

the spin valve sensor, the first and second hard bias and lead layers and the seed layer structure being located between the first and second read gap layers;

ferromagnetic first and second shield layers; and the first and second read gap layers being located between the first and second shield layers.

6. A magnetic read head as claimed in claim 2 including:

the spin valve sensor having first and second side edges;

first and second hard bias and lead layers connected to the first and second side edges of the spin valve sensor;

ferromagnetic first and second shield layers;

the spin valve sensor and the first and second hard bias and lead layers being located between the first and second shield layers;

the first seed layer being a first read gap layer and interfacing the first shield layer;

a nonconductive nonmagnetic second read gap layer located between the spin valve sensor and the second shield layer.

7. A magnetic head assembly including a write head and a read head, the read head including a spin valve sensor, comprising:

the write head including:
  ferromagnetic first and second pole piece layers that have a yoke portion located between a pole tip portion and a back gap portion;
  a nonmagnetic write gap layer located between the pole tip portions of the first and second pole piece layers;
  an insulation stack with at least one coil layer embedded therein located between the yoke portions of the first and second pole piece layers; and
  the first and second pole piece layers being connected at their back gap portions;

the read head including:
  a spin valve sensor with first and second side edges;
  first and second hard bias and lead layers connected to the first and second side edges of the spin valve sensor;
  nonmagnetic nonconductive first and second read gap layers;
  the spin valve sensor and the first and second hard bias and lead layers being located between the first and second read gap layers;
  a ferromagnetic first shield layer; and
  the first and second gap layers being located between the first shield layer and the first pole piece layer;

the spin valve sensor including:
  a ferromagnetic free layer structure that has a magnetic moment;
  a ferromagnetic pinned layer structure that has a magnetic moment;
  an antiferromagnetic pinning layer exchange coupled to the pinned layer structure for pinning the magnetic moment of the pinned layer structure; and
  a nonmagnetic conductive spacer layer located between the free layer structure and the pinned layer structure; and the read head further including:
  a seed layer structure interfacing the pinning layer with the pinning layer being located between the seed layer structure and the pinned layer structure; and
  the seed layer structure comprising first, second and third seed layers wherein the first seed layer is aluminum oxide ($Al_2O_3$), the second seed layer is nickel manganese oxide (NiMnO) and the third seed layer is tantalum (Ta) wherein the second seed layer is located between and interfaces the first and third seed layers and the third seed layer interfaces the pinning layer.

8. A magnetic head assembly as claimed in claim 7 including:

a ferromagnetic second shield layer;

a nonmagnetic isolation layer; and the second shield layer being located between the second gap layer and the isolation layer and the nonmagnetic isolation layer being located between the second shield layer and the first pole piece layer.

9. A magnetic head assembly as claimed in claim 7 wherein the pinning layer is platinum manganese (PtMn).

10. A magnetic head assembly as claimed in claim 9 wherein the pinned layer structure is an antiparallel (AP) pinned layer structure that includes:

ferromagnetic first and second antiparallel (AP) pinned layers with the first AP pinned layer interfacing the pinning layer; and an antiparallel (AP) coupling layer located between the first and second AP layers.

11. A magnetic head assembly as claimed in claim 9 wherein the pinned layer structure is a single ferromagnetic layer.

12. A magnetic head assembly as claimed in claim 9 wherein the first seed layer is said first read gap layer and interfaces the first shield layer.

13. A magnetic disk drive including at least one magnetic head assembly that includes a write head and a read head, the read head including a spin valve sensor, comprising:

the write head including:
  ferromagnetic first and second pole piece layers that have a yoke portion located between a pole tip portion and a back gap portion;
  a nonmagnetic write gap layer located between the pole tip portions of the first and second pole piece layers;
  an insulation stack with at least one coil layer embedded therein located between the yoke portions of the first and second pole piece layers; and
  the first and second pole piece layers being connected at their back gap portions;

the read head including:
  a spin valve sensor that has first and second side edges;
  first and second hard bias and lead layers connected to the first and second side edges of the spin valve sensor;
  nonmagnetic nonconductive first and second read gap layers;
  the spin valve sensor being located between the first and second read gap layers;
  a ferromagnetic first shield layer; and
  the first and second read gap layers being located between the first shield layer and the first pole piece layer;

the spin valve sensor including:
  a ferromagnetic free layer structure that has a magnetic moment;
  a ferromagnetic pinned layer structure that has a magnetic moment;
  an antiferromagnetic pinning layer exchange coupled to the pinned layer structure for pinning the magnetic moment of the pinned layer structure; and
  a nonmagnetic conductive spacer layer located between the free layer structure and the pinned layer structure;

the read head further including:
a seed layer structure interfacing the pinning layer with the pinning layer being located between the seed layer structure and the pinned layer structure; and
the seed layer structure comprising first, second and third seed layers wherein the first seed layer is aluminum oxide ($Al_2O_3$), the second seed layer is nickel manganese oxide (NiMnO) and the third seed layer is tantalum (Ta) wherein the second seed layer is located between and interfaces the first and third seed layers and the third seed layer interfaces the pinning layer; and
a housing;
a magnetic disk rotatably supported in the housing;
a support mounted in the housing for supporting the magnetic head assembly with an air bearing surface (ABS) facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head, to the spindle motor and to the actuator for exchanging signals with the magnetic head assembly, for controlling movement of the magnetic disk and for controlling the position of the magnetic head assembly.

14. A magnetic disk drive as claimed in claim 13 including:
a ferromagnetic second shield layer;
a nonmagnetic isolation layer; and
the second shield layer being located between the second gap layer and the isolation layer and the nonmagnetic isolation layer being located between the second shield layer and the first pole piece layer.

15. A magnetic disk drive as claimed in claim 13 wherein the pinning layer is platinum manganese (PtMn).

16. A magnetic disk drive as claimed in claim 15 wherein the pinned layer structure is an antiparallel (AP) pinned layer structure that includes:
ferromagnetic first and second antiparallel (AP) pinned layers with the first AP pinned layer interfacing the pinning layer; and
an antiparallel (AP) coupling layer located between the first and second AP layers.

17. A magnetic disk drive as claimed in claim 15 wherein the pinned layer structure is a single ferromagnetic layer.

18. A magnetic disk drive as claimed in claim 15 wherein the first seed layer is said first read gap layer and interfaces the first shield layer.

19. A method of making a magnetic read head that includes a spin valve sensor comprising the steps of:
making the spin valve sensor as follows:
forming a ferromagnetic free layer structure that has a magnetic moment;
forming a ferromagnetic pinned layer structure that has a magnetic moment;
forming an antiferromagnetic pinning layer exchange coupled to the pinned layer structure for pinning the magnetic moment of the pinned layer structure; and
forming a nonmagnetic conductive spacer layer located between the free layer structure and the pinned layer structure; and
further making the read head as follows:

forming a seed layer structure interfacing the pinning layer with the pinning layer being located between the seed layer structure and the pinned layer structure; and
forming the seed layer structure as first, second and third seed layers wherein the first seed layer is aluminum oxide ($Al_2O_3$), the second seed layer is nickel manganese oxide (NiMnO) and the third seed layer is tantalum (Ta) wherein the second seed layer is located between and interfaces the first and third seed layers and the third seed layer interfaces the pinning layer.

20. A method as claimed in claim 19 wherein the pinning layer is formed of platinum manganese (PtMn).

21. A method as claimed in claim 20 wherein the forming of the pinned layer includes the steps of:
forming ferromagnetic first and second antiparallel (AP) pinned layers with the first AP pinned layer interfacing the pinning layer; and
forming an antiparallel (AP) coupling layer between the first and second AP layers.

22. A method as claimed in claim 20 wherein the forming of the pinned layer structure forms the pinned layer structure of a single ferromagnetic layer.

23. A method as claimed in claim 20 further including the steps of:
forming the spin valve sensor with first and second side edges;
forming and connecting first and second hard bias and lead layers to the first and second side edges of the spin valve sensor;
forming nonmagnetic nonconductive first and second read gap layers with the spin valve sensor, the first and second hard bias and lead layers and the seed layer structure being located between the first and second read gap layers; and
forming ferromagnetic first and second shield layers with the first and second read gap layers being located between the first and second shield layers.

24. A method as claimed in claim 20 including:
forming the spin valve sensor with first and second side edges;
forming and connecting first and second hard bias and lead layers to the first and second side edges of the spin valve sensor;
forming ferromagnetic first and second shield layers with the spin valve sensor and the first and second hard bias and lead layers being located between the first and second shield layers and with the first seed layer interfacing the first shield layer so as to function as a first read gap layer; and
forming a nonconductive nonmagnetic second read gap layer between the spin valve sensor and the second shield layer.

25. A method of making magnetic head assembly that includes a write head and a read head, comprising the steps of:
a making of the write head including:
forming ferromagnetic first and second pole piece layers in pole tip, yoke and back gap regions wherein the yoke region is located between the pole tip and back gap regions;
forming a nonmagnetic nonconductive write gap layer between the first and second pole piece layers in the pole tip region;

forming an insulation stack with at least one coil layer embedded therein between the first and second pole piece layers in the yoke region; and connecting the first and pole piece layers at said back gap region;

making the read head as follows:

forming a spin valve sensor with first and second side edges;

forming first and second hard bias and lead layers connected to the first and second side edges of the spin valve sensor;

forming nonmagnetic nonconductive first and second read gap layers;

forming the spin valve sensor and the first and second hard bias and lead layers between the first and second read gap layers;

forming a ferromagnetic first shield layer; and forming the first and second read gap layers between the first shield layer and the first pole piece layer; and a making of the spin valve sensor including:

forming a ferromagnetic free layer structure that has a magnetic moment;

forming a ferromagnetic pinned layer structure that has a magnetic moment;

forming an antiferromagnetic pinning layer exchange coupled to the pinned layer structure for pinning the magnetic moment of the pinned layer structure; and forming a nonmagnetic conductive spacer layer located between the free layer structure and the pinned layer structure; and further making the read head as follows:

forming a seed layer structure interfacing the pinning layer with the pinning layer being located between the seed layer structure and the pinned layer structure; and forming the seed layer structure as first, second and third seed layers wherein the first seed layer is aluminum oxide ($Al_2O_3$), the second seed layer is nickel manganese oxide (NiMnO) and the third seed layer is tantalum (Ta) wherein the second seed layer is located between and interfaces the first and third seed layers and the third seed layer interfaces the pinning layer.

26. A method as claimed in claim 25 further including the steps of:

forming a ferromagnetic second shield layer interfacing the second read gap layer; and forming a nonmagnetic isolation layer between the second shield layer and the first pole piece layer.

27. A method as claimed in claim 25 wherein the pinning layer is formed of platinum manganese (PtMn).

28. A method as claimed in claim 27 wherein the forming of the pinned layer includes the steps of:

forming ferromagnetic first and second antiparallel (AP) pinned layers with the first AP pinned layer interfacing the pinning layer; and forming an antiparallel (AP) coupling layer between the first and second AP layers.

29. A method as claimed in claim 27 wherein the forming of the pinned layer structure forms the pinned layer structure of a single ferromagnetic layer.

30. A method as claimed in claim 27 wherein the first seed layer is formed to interface the first shield layer so as to function as a first read gap layer.

* * * * *